US009817438B2

(12) United States Patent
VanDuyn et al.

(10) Patent No.: US 9,817,438 B2
(45) Date of Patent: Nov. 14, 2017

(54) MAGNETICALLY-COUPLED MULTI-COMPONENT COMMUNICATION DEVICES AND METHODS

(71) Applicant: Echostar Technologies L.L.C., Englewood, CO (US)

(72) Inventors: Luke VanDuyn, Conifer, CO (US); Neil T. Marten, Lakewood, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/041,927

(22) Filed: Feb. 11, 2016

(65) Prior Publication Data

US 2017/0235331 A1     Aug. 17, 2017

(51) Int. Cl.
*G06F 1/16* (2006.01)
*H04B 1/3827* (2015.01)
*H04B 1/3888* (2015.01)

(52) U.S. Cl.
CPC ............ *G06F 1/163* (2013.01); *H04B 1/385* (2013.01); *H04B 1/3888* (2013.01)

(58) Field of Classification Search
CPC ........ G06F 1/163; H04B 1/3888; H04B 1/385
See application file for complete search history.

(56) References Cited

U.S. PATENT DOCUMENTS

| 6,807,766 B1 | 10/2004 | Hughes et al. | |
|---|---|---|---|
| 2001/0026240 A1 | 10/2001 | Neher | |
| 2007/0279852 A1* | 12/2007 | Daniel | A44C 5/0007 361/679.03 |
| 2011/0003665 A1* | 1/2011 | Burton | G04F 10/00 482/9 |
| 2011/0176395 A1* | 7/2011 | Mooring | G04B 37/005 368/276 |
| 2012/0274508 A1* | 11/2012 | Brown | G04F 10/00 342/357.25 |

(Continued)

FOREIGN PATENT DOCUMENTS

CN          204166295          2/2015

OTHER PUBLICATIONS

Chen et al., *MutaBand: The Smart Wristband Designed Using a Modular Approach* (Coursework submission), Algonquin College, School of Advanced Technology, Dec. 3, 2014, 18 pages.

(Continued)

*Primary Examiner* — Lewis West
(74) *Attorney, Agent, or Firm* — Kilpatrick Townsend & Stockton LLP

(57) ABSTRACT

Various embodiments of two-way communication devices and tracker devices are presented. Such a device may include a processing unit, comprising: a housing, one or more processors; a microphone, a speaker; and a first electrical connector for receiving power, wherein the one or more processors, the microphone, and the speaker are housed by the housing. Such a device may include a wristband that includes one or more integrated power sources that are permanently housed within the wristband. The one or more integrated power sources may have a second electrical connector to supply power to the processing unit when the processing unit is removably coupled with the wristband. The device may include a plurality of magnets to removably couple the processing unit with the wristband.

16 Claims, 20 Drawing Sheets

(56) References Cited

U.S. PATENT DOCUMENTS

| | | | |
|---|---|---|---|
| 2014/0180019 A1* | 6/2014 | Martinez | A61B 5/02055 600/301 |
| 2015/0116117 A1* | 4/2015 | Wisbey | A61B 5/746 340/575 |
| 2015/0116125 A1* | 4/2015 | Armstrong | A61B 5/0456 340/870.01 |
| 2015/0118665 A1* | 4/2015 | Armstrong | G06Q 10/101 434/236 |
| 2015/0119198 A1* | 4/2015 | Wisbey | A61B 5/02405 482/9 |
| 2015/0120203 A1* | 4/2015 | Wisbey | A61B 5/4812 702/19 |
| 2015/0190072 A1* | 7/2015 | Armstrong | G06F 19/3481 600/301 |
| 2015/0238141 A1 | 8/2015 | Lai | |
| 2015/0261189 A1 | 9/2015 | Connolly | |
| 2015/0333302 A1* | 11/2015 | Johns | H01M 2/1066 429/127 |
| 2016/0109953 A1* | 4/2016 | Desh | G06F 3/017 345/169 |
| 2016/0161985 A1* | 6/2016 | Zhang | G06F 1/163 361/679.03 |

OTHER PUBLICATIONS

U.S. Appl. No. 15/041,943, filed Feb. 11, 2016 Non-Final Rejection dated Nov. 10, 2016, all pages.

* cited by examiner

MAGNETICALLY-COUPLED MULTI-COMPONENT COMMUNICATION DEVICES AND METHODS

CROSS REFERENCES

This Application is related to U.S. patent application Ser. No. 15/041,943, filed on the same day, Feb. 11, 2016, entitled "Swappable Multi-Component Communication Devices and Methods," the entire disclosure of which is incorporated by reference for all purposes.

BACKGROUND

Wearable smart devices can provide wearers and other users with useful information. For instance, a wearable smart device can be used to track activity of an elderly person, such as to determine if he has left home unexpectedly. Further, wearable smart devices can be worn to track a person's physical activity, such as how far he has travelled or exercised on a given day. One difficultly with wearable smart devices is providing such devices with power. Typically, a wearable smart device is separated from a user's body to charge. However, while the device is separated from the wearer, the device cannot effectively track activity of the wearer.

SUMMARY

In some embodiments, a two-way (or one-way) communication device is present. The device may include a processing unit, including: a housing, one or more processors; a microphone, a speaker; and a first electrical connector for receiving power. The one or more processors, the microphone, and the speaker may be housed by the housing. The device may include a wristband. The wristband may include one or more integrated power sources that are permanently housed within the wristband. The one or more integrated power sources may have a second electrical connector to supply power to the processing unit when the processing unit is removably coupled with the wristband. The device may include a plurality of magnets to removably couple the processing unit with the wristband. The plurality of magnets may removably couple the processing unit with the wristband causes the first electrical connector to be electrically connected with the second electrical connector.

Embodiments of such a device may include one or more of the following features: The wristband may include a first band section and a second band section and the one or more integrated power sources are permanently housed within either the first band section, the second band section, or both the first band section and the second band section. The first band section may include a first magnet of the plurality of magnets, the second band section may include a second magnet of the plurality of magnets, and the processing unit may include a third magnet and fourth magnet of the plurality of magnets. The device may include a fastening system to removably couple the first band section with the second band section. The processing unit may include a plurality of sliders, wherein the plurality of sliders are configured to slide into a plurality of slide paths present on the first band section and the second band section. The plurality of slide paths present on the first band section and the second band section may permit the processing unit to be removably coupled with the first band section and the second band section from a wrist side of the first band section and the second band section. The second electrical connector may be integrated with a magnet of the plurality of magnets. The device may include a global positioning system (GPS) sensor that receives power from the one or more integrated power sources of the wristband. The processing unit may include a wireless transmitter that is configured to periodically transmit an indication of location of the two-way communication device determined using the GPS sensor. The one or more integrated power sources may be configured to be recharged via the second electrical connector while the wristband is detached from the processing unit.

In some embodiments, a two-way communication apparatus is presented. The apparatus may include a processing unit. The processing unit may include: a housing means (e.g., made from a rigid or semi-rigid material such as rubber, plastic, or metal), a processing means (e.g., one or more processors and/or controllers); an audio input means (e.g., one or more microphones), an audio output means (e.g., one or more speakers); and a first power connection means (e.g., an electrical contact or connector), wherein the processing means. The audio input means, and the audio output means may be housed by the housing means. The apparatus may include a wristband means (e.g., straps, bands, or other components to wrap around a user's wrist). The wristband means may include one or more integrated power means (e.g., one or more batteries and/or capacitors) that are permanently housed within the wristband means. The one or more integrated power means may have a second power connection means (e.g., electrical contact or connector) to supply power to the processing unit when the processing unit is removably coupled with the wristband means. The apparatus may include a plurality of magnetic means (e.g., magnets, ferromagnetic metal) to removably couple the processing unit with the wristband means, wherein the plurality of magnetic means removably coupling the processing unit with the wristband means causes the first power connection means to electrically connect with the second power connection means.

Embodiments of such an apparatus may include one or more of the following features: The wristband means may include a first band section and a second band section and the one or more integrated power means are permanently housed within either the first band section, the second band section, or both the first band section and the second band section. The first band section may include a first magnetic means of the plurality of magnetic means, the second band section may include a second magnetic means of the plurality of magnetic means, and the processing unit may include a third magnetic means and fourth magnetic means of the plurality of magnetic means. The apparatus may include a fastening means (e.g., buckle, clasp, Velcro, pegs/coupling holes, etc.) to removably couple the first band section with the second band section. The processing unit may include a plurality of slider means, wherein the plurality of slider means are configured to slide into a plurality of slide path means present on the first band section and the second band section. The plurality of slide path means present on the first band section and the second band section may permit the processing unit to be removably coupled with the first band section and the second band section from a wrist side of the first band section and the second band section. The second power connection means may be integrated with a magnet of the plurality of magnetic means. The apparatus may include a global positioning system (GPS) sensor that receives power from the one or more integrated power means of the wristband means. The processing unit may include a wireless transmitting means (e.g., short range wireless transmitter, 802.11 wireless network interface, WiFi Direct interface, Bluetooth interface, etc.) that is configured to packetized data comprising audio received via the audio input means. The one or more integrated power means may be configured to be recharged via the second power connection means while the wristband means is detached from the processing unit.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3A illustrates a top view of an embodiment of a magnetically-coupled multi-piece tracker device.

FIG. 3B illustrates a bottom view of an embodiment of a magnetically-coupled multi-piece tracker device.

FIG. 3C illustrates a side view of an embodiment of a magnetically-coupled multi-piece tracker device.

FIG. 4A illustrates an angled view of an embodiment of a first removable band section of a magnetically-coupled multi-piece tracker device.

FIG. 4B illustrates a side view of an embodiment of a first removable band section of a magnetically-coupled multi-piece tracker device.

FIG. 4C illustrates a side view of an embodiment of a first removable band section of a magnetically-coupled multi-piece tracker device.

FIG. 4D illustrates a side view of an embodiment of a first removable band section of a magnetically-coupled multi-piece tracker device.

FIG. 6A illustrates an angled top view of an embodiment of a processing unit of a magnetically-coupled multiple piece band.

FIG. 6B illustrates a side view of an embodiment of a processing unit of a magnetically-coupled multiple piece band.

FIG. 6C illustrates another side view of an embodiment of a processing unit of a magnetically-coupled multiple piece band.

FIG. 6D illustrates a top view of an embodiment of a processing unit of a magnetically-coupled multiple piece band.

FIG. 15A illustrates a top view of an embodiment of a slide-coupled tracker device.

FIG. 15B illustrates a bottom view of an embodiment of a slide-coupled tracker device.

FIG. 15C illustrates a side view of an embodiment of a slide-coupled tracker device.

DETAILED DESCRIPTION

Figure 1:
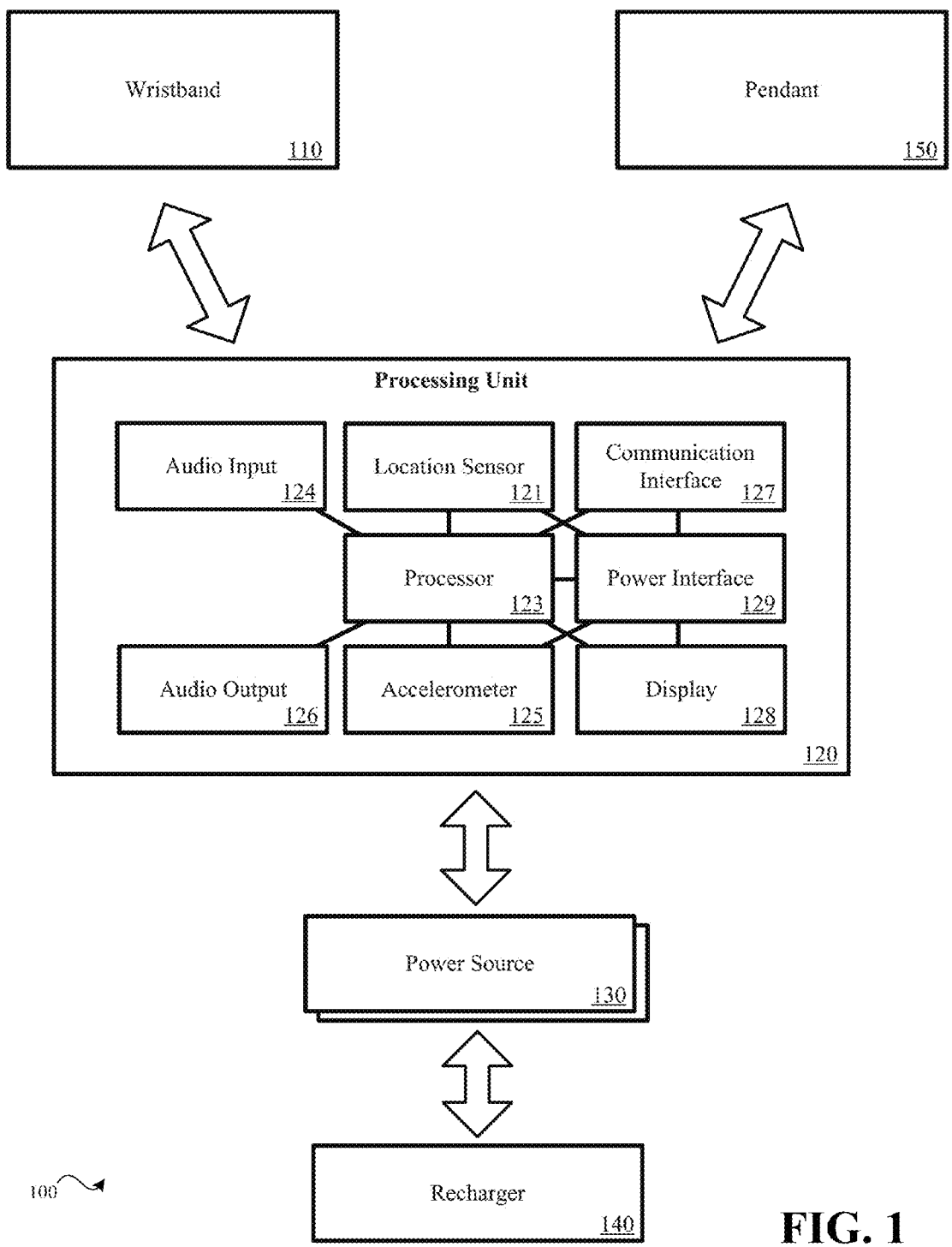
FIG. 1 illustrates a block diagram of an embodiment of a tracker device.

Various embodiments of a wearable activity tracker, two-way communication device, or one-way communication device (collectively referred to as "tracker" devices for short) are detailed herein that allow for a power source of the tracker that has a depleted charge to be quickly switched with another power source that has a sufficient charge to power use of the tracker. A useful arrangement may generally involve a first power source being charged while a second power source is installed on the tracker. When the second power source is depleted, the power sources are switched, the first power source is used to charge the tracker, and the second power source is recharged.

Being able to quickly swap a power source may be useful for multiple types of trackers. For a tracker that is used for two-way communication, it may be useful to be able to switch power sources such that the user (also referred to as a "wearer") can at any time communicate with another remote person, such as a caretaker. As another example, for a tracker that is focused on personal activity (e.g., exercise, sleep), it may be useful to be able to switch power sources before a user goes to bed. As such, little time elapses when the tracker is removed from the wearer's body. This arrangement may effectively allow the wearer's activity to be tracked during the day when he is active and also when he is trying to sleep or asleep (e.g., to monitor sleep patterns). For a tracker device that is focused on monitoring the location of a person (e.g., for safety), being able to quickly switch power sources for the tracker may be of high importance—especially because such a tracker may broadcast a location of itself and, thus, consume a greater amount of power. Further, if a tracker is being used to track an elderly person or child, it may be important that a significant period of time with the tracker removed from the wearer not elapse. By having a power source that can be quickly swapped out, a high up time of the tracker can be achieved.

In some embodiments, one or more power sources (e.g., batteries or high-capacity capacitors) can be permanently housed within one or more straps of a wristband. The wristband may be removably connected with a processing unit that houses the majority of the electrical components of the tracker device, such as a location sensor (e.g., GPS sensor), motion detector (e.g., accelerometer, gyroscope), one or more processors, and a wireless communication interface. The processing unit may be attached with the wristband via magnets and sliders. When the magnets and sliders are fully engaged, the processing unit may receive power from one or more power sources, such as one or more batteries, present within the wristband.

In other embodiments, the processing unit may be slid into and out of a cavity on the wristband having the permanently attached battery. This cavity may be accessible via a side of the wristband, thus allowing the user to continue wearing the wristband when the processing unit is removed. In a variation on such an embodiment, rather than the power source being permanently coupled with the wristband, the power source may be removed via the cavity of the wristband along with the processing/location unit. Alternatively, the power source may be permanently coupled or removably coupled with the processing unit. The processing unit in combination with the power source may be slid into and out of the cavity of the wristband from a side access port of the wristband.

In another embodiment, the battery may be attached with the processing unit while the battery and processing unit is separated from the wristband; then the coupled battery and processing unit may be inserted as a single unit into a cavity of the wristband accessible only from an underside of the wristband (and is thus accessible only while the wristband is off of a wearer's wrist).

Further, in the above embodiments, by the processing/location unit being removable from the wristband, the processing/location unit can be removably attached as a pendant to be worn around a wearer's neck or, alternatively, worn by the user in an alternate form (e.g., placed in pocket, worn as an anklet, etc.). The pendant may have its own power source permanently incorporated as part of the pendant or a removable power source that is coupled with the processing unit prior to the processing unit being attached to the pendant.

FIG. 1 illustrates a block diagram of an embodiment of a tracker device system 100. Such a tracker device system 100 (which can also be referred to as a two-way communication device system) can be used for activity monitoring, sleep monitoring, exercise monitoring, wearer tracking, two-way communication, and/or other purposes. Tracker device system 100 may include: wristband 110, processing unit 120, power source 130, recharger 140, and pendant 150. It should be understood that in other embodiments of tracker device system 100, fewer or additional components may be included. For example, in other embodiments of tracker device system 100, pendant 150 may not be present. In some embodiments, additionally or alternatively, another mechanism may be included as part of the system for coupling processing unit 120 to a user.

Wristband 110 may include multiple straps (e.g., two straps) or may be formed from a single piece of flexible material (e.g., rubber, silicone). If wristband 110 includes multiple straps, wristband 110 may include a fastening system that allows the straps to be removably fastened together. Such a fastening system may allow for the circumference of the wristband to be expanded and contracted to fit the wrists of various sized wearers. If wristband 110 is formed from a single piece of material, to attach with a user's wrist, processing unit 120 may be decoupled from wristband 110, thus allowing wristband 110 to be slipped off of the user's wrist.

Processing unit 120 may be removably coupled with wristband 110 in accordance with the various embodiments detailed herein in relation to FIGS. 2A through 18D. Processing unit 120 may include: location sensor 121, processor 123, audio input 124, accelerometer 125, audio output 126, communication interface 127, display 128, and power interface 129. Location sensor 121 may be a sensor unit that received power from power interface 129. Location sensor 121 may be global positioning system (GPS) sensor or other form of satellite-based positioning system sensor. Processor 123 may be a general purpose or specialized processor that is in communication with location sensor 121, accelerometer 125, and communication interface 127, and receives power from power interface 129. In some embodiments, multiple processors are present as part of processing unit 120.

Accelerometer 125 may be used to determine motion of processing unit 120, and, in turn, of the user who is wearing the tracker device that includes processing unit 120. In some embodiments, multiple accelerometers and/or one or more gyroscopes may be present. Accelerometer 125 may be in communication with processor 123 and receives power from power interface 129. Generally, accelerometer 125 and location sensor 121 may be referred to as "activity sensors," since location and/or acceleration can be used to determine an activity being performed. Communication interface 127 may include one or more wireless communication circuits (or wired communication circuits) that communicate with one or more remote computerized devices. For instance, communication interface 127 may communicate using the IEEE 802.11 standard set, IEEE 802.15.4 standard set, Bluetooth®, Zigbee®, Z-wave® or some other wireless communication protocol. Communication interface 127 may include one or more antennas and may be in communication with processor 123 and may receive power from power interface 129.

Audio input 124 and audio output 126 may enable two-way communication between a wearer and a remote person, such as a caretaker or parent, via communication interface 127. Audio input 124 may be an on-board microphone and audio output 126 may be a speaker. To enable the communication link, a wearer may push (and hold) a button on processing unit 120. This may enable a two-way communication link between the wearer and a predefined remote user's device, such as a smartphone or another processing unit. Audio received by audio input 124 may be packetized and transmitted via communication interface 127 to the remote user's device via one or more networks. Audio transmitted by the remote user's device may be received in packetized form by communication interface 127 and output by audio output 126.

Power interface 129 may include one or more electrical connectors that are configured to receive power from power source 130 when power source 130 is coupled with processing unit 120. Depending on the embodiment, processing unit 120 may be permanently coupled with power source 130 or may be removably coupled. In some embodiments, power interface 129 may be integrated with one or more magnets used to removably couple processing unit 120 with wristband 110. In other embodiments, power interface 129 may include one or more contacts that are configured to connect with counterpart contacts of power source 130 to receive power. Power interface 129 may distribute power to the various other components of processing unit 120.

One or more displays, such as display 128 may be present on processing unit 120. Display 128 may be used to display information to a user. Display 128 may take the form of lights that can be illuminated in various patterns by processor 123. Such lights may be illuminated using various colors. Display 128 may be a form of electronic display, such as an LCD or OLED display, for presenting text and/or graphics to a user.

Processing unit 120 includes a housing which houses location sensor 121, processor 123, accelerometer 125, communication interface 127, and power interface 129. Power interface 129 may be the only component of processing unit 120 that is partially exposed from the housing. Such a housing may make processing unit 120 water resistant or water proof. Further, such a housing may be permanently sealed such that a user cannot easily access the individual components of processing unit 120.

Depending on the embodiment, power source 130 may be removably coupled with processing unit 120 and/or wristband 110. In some embodiments, power source 130 is permanently housed within or on wristband 110. For instance, in one or more straps of wristband 110, power source 130 may be housed. Therefore, in such embodiments, to recharge power source 130, wristband 110 may be removed from a user's wrist and connected with recharger 140. Power source 130 may include one or more power interfaces that are configured to couple with and supply power to power interface 129 when power source 130 is coupled with processing unit 120. For example, if power source 130 is permanently coupled with and housed by wristband 110, power source 130 may have one or more power interfaces that are electrically connected with power interface 129 when processing unit 120 is removably coupled with wristband 110.

In some embodiments, tracker device system 100 may include multiple power sources 130. While a first power source is coupled with recharger 140 and recharging, a second power source may be connected with processing unit 120 and providing power to power interface 129 to power the various components of processing unit 120. If, for example, power source 130 is permanently incorporated with wristband 110, two wristbands may be present, each with a power source that can be alternatively connected with processing unit 120 and recharger 140.

Recharger 140 may be a device configured to be connected to a household power supply (e.g., an outlet) to receive 110 V or 220 V power which is used to charge power source 130. Recharger 140 may have one or more power interfaces that can be connected with a power interface of power source 130 to recharge power source 130. The same power interface of power source 130 that is used to electrically connect with power interface 129 may be used to electrically connect with a power interface of recharger 140.

Pendant 150 represents an alternate way in which processing unit 120, and, possibly, power source 130, can be worn by a user. In some embodiments, a power source may be permanently integrated with pendant 150. Therefore, for example, a user may removably couple processing unit 120 and/or power source 130 with pendant 150 such that the user wears processing unit 120 and power source 130 around his neck rather than using wristband 110 to wear such components on his wrist. While pendant 150 is an example of how a user may alternatively wear processing unit 120, it should be understood that other physical mechanisms may be used to removably carry processing unit 120 and power source 130 on a user's body.

Figure 2A:
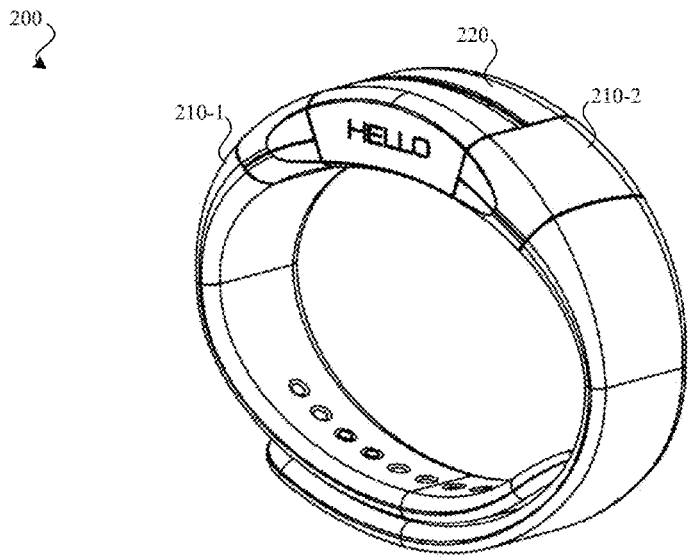
FIG. 2A illustrates an angled view of an embodiment of magnetically-coupled multi-piece tracker device.
Figure 2B:
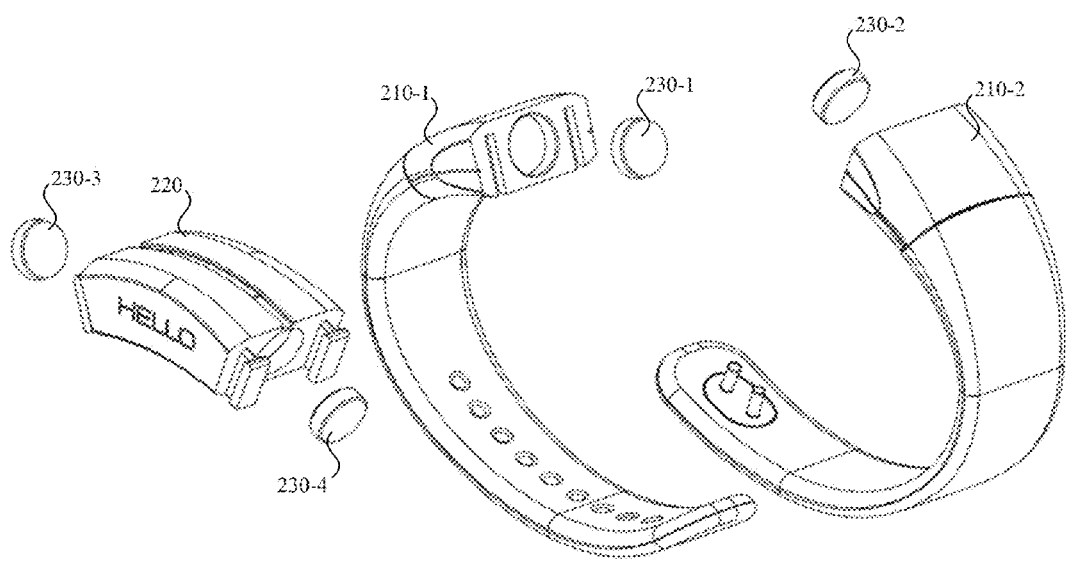
FIG. 2B illustrates an exploded angled view of an embodiment of a magnetically-coupled multi-piece tracker device.

Tracker device system 100 or two-way communication device system 100 may be worn by a user on a wrist or ankle using the removable attachment embodiments detailed in FIGS. 2A-16. FIGS. 2A-6E represent an embodiment of a magnetically-coupled multi-piece tracker device. It should be understood that all the embodiments detailed in this document may be used for tracking a user and/or two-way communication. A magnetically-coupled multi-piece tracker device can use one or more magnets to removably attach a processing unit to sections of a removable band. FIG. 2A illustrates an angled view of a magnetically-coupled multi-piece tracker device (MMTD) 200 with its components coupled together. MMTD 200 includes processing unit 220 and removable wristband sections 210 (which includes removable wristband section 210-1 and removable wristband section 210-2, also referred to as "band sections"). MMTD 200 is designed to allow easy coupling and decoupling of processing unit 220 from removable band sections 210. One or more batteries (or another form of power source) may be housed in removable band sections 210. Thus, to allow the processing unit 220 to be worn by the user and have sufficient power, removable band sections 210 may be worn while another pair of removable band sections 210 are being charged. Processing unit 220 is represented in FIG. 1 as processing unit 120. FIG. 2B illustrates an exploded angled view of an MMTD 200. When viewed in exploded form, magnets 230 (which include magnets 230-1, 230-2, 230-3, and 230-4) are visible. Magnet 230-1 may couple with magnet 230-3 and, possibly, magnet 230-4. Magnet 230-2 may couple with magnet 230-4 and, possibly, magnet 230-3. As such, in some embodiments, processing unit 220 can be reversed. Details of the individual components of MMTD 200 are discussed in relation to FIGS. 3A-6E.

Figure 3D:
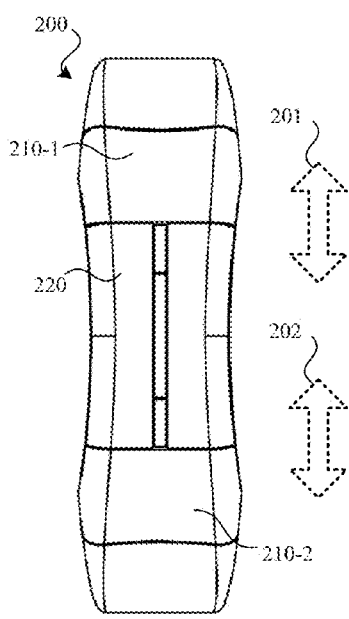
FIG. 3D illustrates a side view of an embodiment of a magnetically-coupled multi-piece tracker device.
Figure 3D:
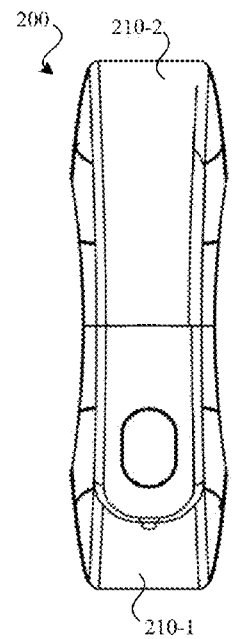
Figure 3D:
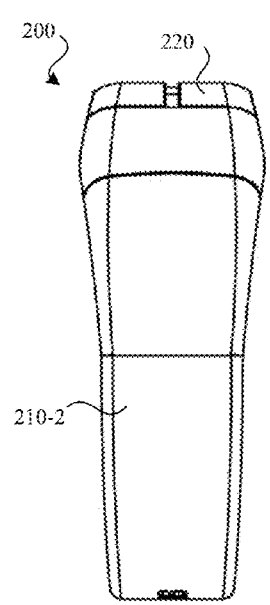
Figure 3D:
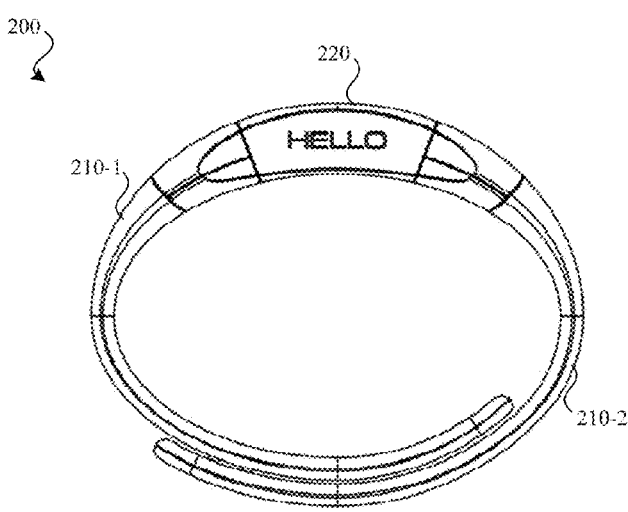

FIG. 3A illustrates a top view of MMTD 200. Processing unit 220, when viewed from the top, may have pinched sides. Processing unit 220, when coupled with removable band section 210-1 and removable band section 210-2, may form a smooth surface. FIG. 3B illustrates a bottom view of MMTD 200. Removable band section 210-2 and removable band section 210-1 may taper from a thicker region located near processing unit 220 to a thinner region designed to sit on an inside of a user's wrist. FIG. 3C illustrates a side view of MMTD 200. From such a side view, it can be seen that in some embodiments a top surface of processing unit 220 is substantially flat with an indented center version (which may serve as an auxiliary display). FIG. 3D illustrates a side view of MMTD 200. From the side, a display of processing unit 220 is visible. Depending on whether a user is wearing MMTD 200 on his left or right wrist, it may be desirable to have the display of processing unit 220 facing away from the user's hand to make a display more easily visible to the user. Referring to FIG. 3A, it may be possible to remove processing unit 220, rotate it 180° and re-couple processing unit 220 with removable band sections 210. Alternatively, a user may first remove the entire MMTD 200 from his wrist and rotate MMTD 180° if the user desires the display of processing unit 220 to be facing the opposite direction.

FIG. 4A illustrates an angled view of removable band section 210-1 of an MMTD. FIG. 4B illustrates a side view of removable band section 210-1 of an MMTD. Removable band section 210-1 may include recessed magnet housing 401, slide paths 402, coupling holes 403, housing 404, battery 405, and flexible band 406. Recessed magnet housing 401 may be used to house a magnet. Such a magnet may be permanently or removably coupled with recessed magnet housing 401. When a magnet is present within recessed magnet housing 401, the magnet may couple with another magnet or a piece of metal located on a flush or nearly flush surface of processing unit 220 (when processing unit 220 is coupled with removable band section 210-1). While recessed magnet housing 401 is shown as circular to accommodate a cylindrical magnet, it should be understood that such a shape is merely exemplary. Recessed magnet housing 401 may be alternatively shaped to accommodate other shapes of magnets. In some embodiments, recessed magnet housing 401 may house a piece of metal rather than a magnet. Such a piece of metal may removably engage with a magnet present on a flush or nearly flush surface of processing unit 220 when processing unit 220 is coupled with removable band section 210-1.

Slide paths 402 (which include slide paths 402-1 and slide paths 402-2) are slots present on housing 404 that receive sliders located on processing unit 220. When sliders are engaged in slide paths 402, magnetic force between the magnet present in recessed magnet housing 401 and on the processing unit may prevent the sliders of the processing unit from inadvertently sliding out of slide paths 402. Sliders may have an enlarged region to prevent sliders of processing unit 220 from being pulled from slide paths 402 via force applied as indicated by arrows 201 and 202 of FIG. 3A. Further, when sliders are partially engaged in slide paths 402, the attraction between the two magnets or one magnet and metal may serve to "snap" the sliders into a fully engaged position with slide paths 402. Arrow 410 illustrates the engagement and disengagement paths of sliders with slide paths 402. Notably, processing unit 220 may be attached and detached from a wrist-side of housing 404 (that is, the side of housing 404 proximate to a user's wrist when being worn), thus preventing processing unit 220 from being detached while MMTD 200 is attached to a user's wrist. Slide paths 402 may cease or be obstructed away from the user's wrist such that processing unit 220 cannot be removed or installed from a top side of removable band sections 210.

Housing 404 may be shaped to form slide paths 402 and recessed magnet housing 401. Further, housing 404 may house a battery (or other form of power source, such as a capacitor or power generator) that is used to power processing unit 220. Housing 404 may be rigid or semi-rigid to protect battery 405. Battery 405 may be permanently housed within housing 404 and may not be removed from removable band section 210-1.

Flexible band 406 may be more flexible than housing 404, such as being made of rubber or silicone. Present on flexible band 406 may be a plurality of coupling holes 403 that can be used to adjust the total circumference of MMTD 200 to accommodate different wrist circumferences.

FIG. 4C illustrates a side view of removable band section 210-1 of a magnetically-coupled multi-piece tracker device. Visible in FIG. 4C are enlarged slide paths regions 407, which include enlarged slide path region 407-1 and enlarged slide path region 407-2. Such enlarged slide path regions 407 may accommodate similarly shaped portions of the sliders of processing unit 220. Further, present within slide paths 402 may be electrical connections, such as metallic connectors, which allow processing unit 220 to receive power from battery 405 located within housing 404. Alternatively, the magnet present within recessed magnet housing 401 may serve as an electrical connector to allow power to be transferred from battery 405 to processing unit 220. The same electrical connectors used to obtain power from battery 405 and supply such part of processing unit 220 may also be used to charge battery 405 when processing unit 220 has been removed from removable band section 210-1. In some embodiments, a different form of power source is used instead of battery 405.

Figure 4E:
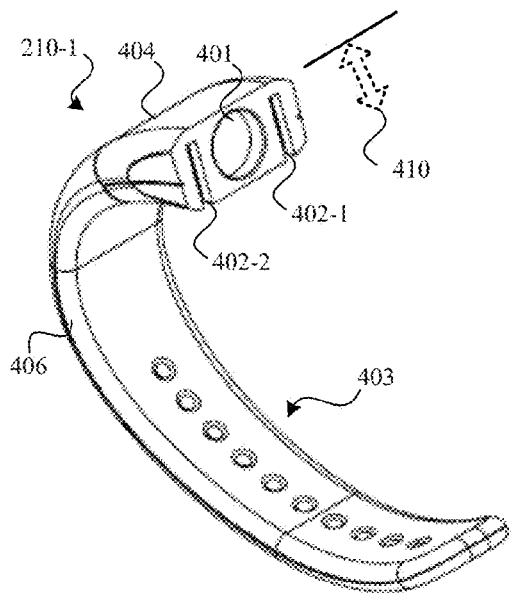
FIG. 4E illustrates a bottom view of an embodiment of a first removable band section of a magnetically-coupled multi-piece tracker device.
Figure 4E:
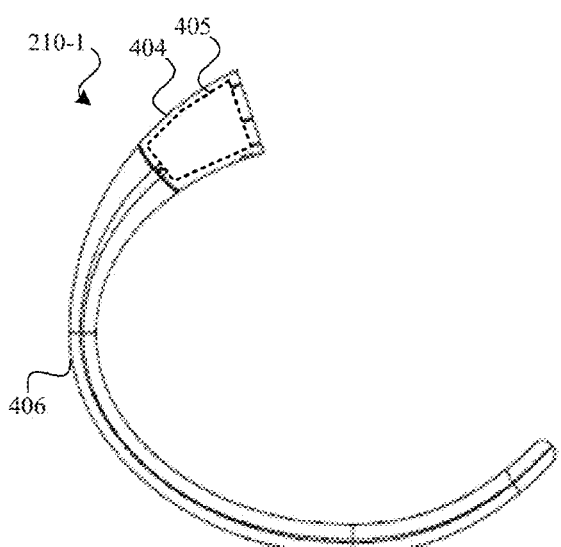
Figure 4E:
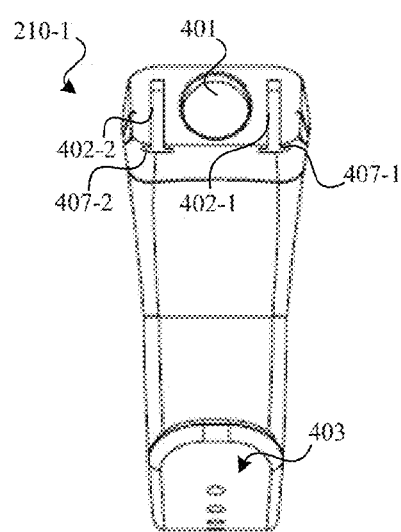
Figure 4E:
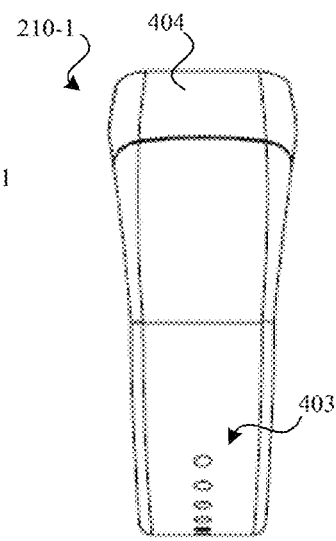
Figure 4E:
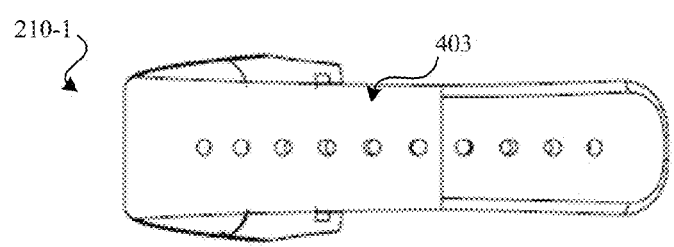

FIG. 4D illustrates a side view of removable band section 210-1 of a magnetically-coupled multi-piece tracker device and FIG. 4E illustrates a bottom view of removable band section 210-1 of a magnetically-coupled multi-piece tracker device. In such views coupling holes 403 are visible.

Figure 5A:
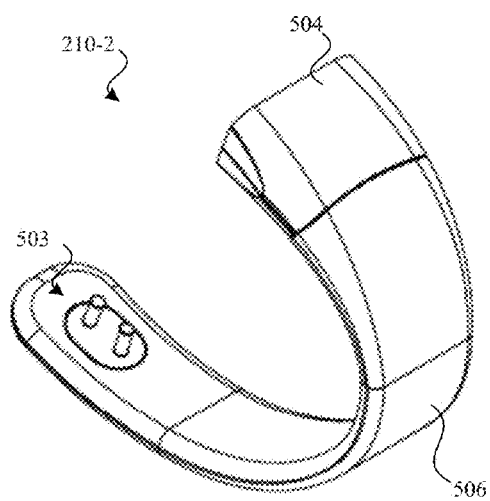
FIG. 5A illustrates an angled view of an embodiment of a second removable band section of a magnetically-coupled multi-piece tracker device.
Figure 5B:
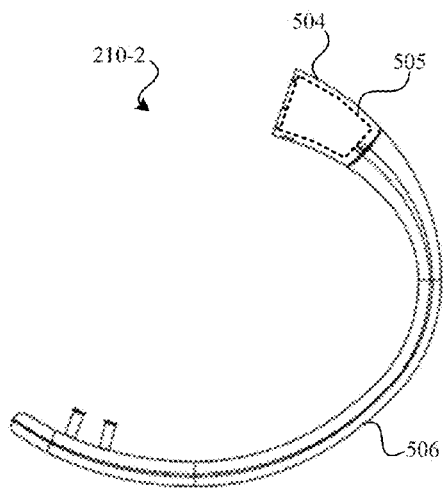
FIG. 5B illustrates a side view of an embodiment of a second removable band section of a magnetically-coupled multi-piece tracker device.

FIG. 5A illustrates an angled view of removable band section 210-2 of a magnetically-coupled multi-piece tracker device. FIG. 5B illustrates a side view of removable band section 210-2 of a magnetically-coupled multi-piece tracker device. Removable band section 210-2 may include recessed magnet housing 501, slide paths 502, adjustable coupling pegs 503, housing 504, battery 505, and flexible band 506. Recessed magnet housing 501 may be used to house a magnet. Such a magnet may be permanently or removably coupled with recessed magnet housing 501. When a magnet is present within recessed magnet housing 501, the magnet may couple with another magnet or a piece of metal located on a flush or nearly flush surface of processing unit 220 (when processing unit 220 is coupled with removable band section 210-1). While recessed magnet housing 501 is shown as circular to accommodate a cylindrical magnet, it should be understood that such a shape is merely exemplary. Recessed magnet housing 501 may be alternatively shaped to accommodate other shapes of magnets. In some embodiments, recessed magnet housing 501 may house a piece of metal rather than a magnet. Such a piece of metal may removably engage with a magnet present on a flush or nearly flush surface of processing unit 220 when processing unit 220 is coupled with removable band section 210-1.

Slide paths 502 (which includes slide paths 502-1 and slide paths 502-2) are slots present on housing 504 that receive sliders located on processing unit 220 and may function similarly to the previously-detailed slide paths 402. Housing 504 may be shaped to form slide paths 502 and recessed magnetic housing 501. Further, housing 504 may house a battery (or other form of power source, such as a capacitor or power generator) that is used to power processing unit 220. Housing 504 may be rigid or semi-rigid to protect battery 505. Battery 505 may be permanently housed within housing 504 and may not be removed from removable band section 210-1. In some embodiments, only either housing 404 or 504 houses a power source. In some embodiments, both housings 404 and 504 house power sources used to power processing unit 220.

Flexible band 506 may be more flexible than housing 504, such as being made of rubber or silicone. Present on flexible band 506 may be one or more coupling pegs 503 that can be used to adjust the total circumference of MMTD 200 to accommodate different wrist circumferences. Coupling pegs 503 may be removably inserted into coupling holes 403. It should be understood that other forms of buckling or temporary coupling arrangements may be used to connect removable band section 210-1 with removable band section 210-2.

Figure 5C:
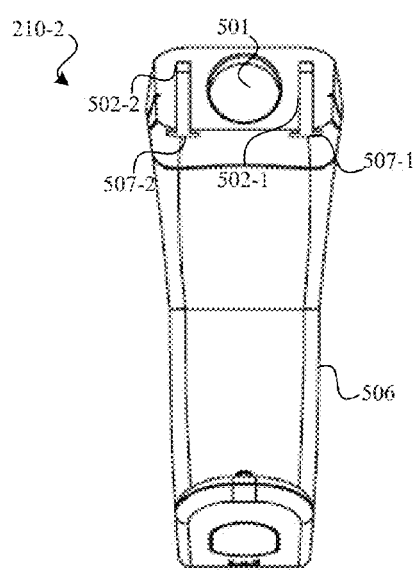
FIG. 5C illustrates a side view of an embodiment of a second removable band section of a magnetically-coupled multi-piece tracker device.

FIG. 5C illustrates a side view of removable band section 210-2 of an MMTD. Visible in FIG. 5C are enlarged slide paths regions 507, which include enlarged slide path region 507-1 and enlarged slide path region 507-2. Such enlarged slide path regions 507 may accommodate similarly shaped portions of the sliders of processing unit 220. Further, if a battery 505 is present within removable band section 210-1, present within slide path regions 507 may be electrical connections, such as metallic connectors, which allow processing unit 220 to receive power from battery 505 located within housing 504 via metallic connectors present on sliders of processing unit 220. Alternatively, the magnet present within recessed magnet housing 501 may serve as one of the electrical connectors to allow power to be transferred from battery 505 to processing unit 220. The same electrical connectors used to obtain power from battery 505 and supply such part of processing unit 220 may also be used to charge battery 505 when processing unit 220 has been removed from removable band section 210-1.

Figure 5D:
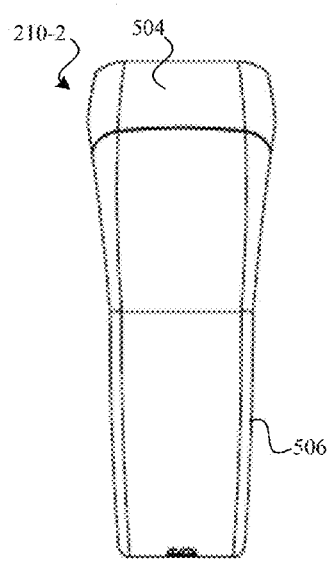
FIG. 5D illustrates a side view of an embodiment of a second removable band section of a magnetically-coupled multi-piece tracker device.
Figure 5E:
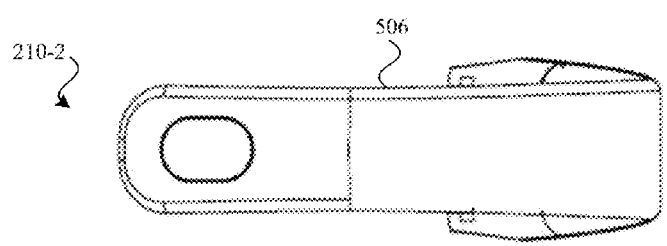
FIG. 5E illustrates a bottom view of an embodiment of a second removable band section of a magnetically-coupled multi-piece tracker device.

Additionally, FIG. 5D illustrates a side view of removable band section 210-2 and FIG. 5E illustrates a bottom view of removable band section 210-2 of a magnetically-coupled multi-piece tracker device.

FIG. 6A illustrates an angled top view of processing unit 220 of an MMTD. Processing unit 220 is configured to be coupled with and decoupled from removable band sections 210. Processing unit 220, which represents an embodiment of processing unit 120, may additionally include: housing 601, communication lights 602, display 603, sliders 604, enlarged sliders sections 605, and recessed magnet housing 606.

Housing 601 may be made of a rigid or semi-rigid material, such as a hard plastic. Part of housing 601 may be recessed magnet housing 606. Recessed magnet housing 606 may be used to house a magnet. Such a magnet may be permanently or removably coupled with recessed magnet housing 606. When a magnet is present within recessed magnet housing 606, the magnet may couple with another magnet or a piece of metal located on a flush or nearly flush surface of a removable band section (when processing unit 220 is coupled with the removable band section). While recessed magnet housing 606 is shown as circular to accommodate a cylindrical magnet, it should be understood that such a shape is merely exemplary. Recessed magnet housing 606 may be alternatively shaped to accommodate other shapes of magnets. In some embodiments, recessed magnet housing 606 may house a piece of metal rather than a magnet. Such a piece of metal may removably engage with a magnet present on a flush or nearly flush surface of a removable band section when processing unit 220 is coupled with the removable band section.

Also present as part of (or attached to) housing 601 may be sliders 604 (which include slider 604-1 and slider 604-2)

and enlarged slider sections 605 (which include enlarged slider section 605-1 and enlarged slider section 605-2). Sliders 604 may removably slide into slide paths 502. Sliders 604 may only be slid into slide paths 502 from below (where a user's wrist is located when worn). Slide paths 502 end before reaching a top surface of the removable band sections to prevent processing unit 220 from being slid off of slide paths 502 away from a user's wrist. Enlarged slider sections 605 serve to keep processing unit 220 coupled with the removable band sections even if force is applied to pull the removable band sections away from processing unit 220. In some embodiments, four sliders 604 (and four associated enlarged slider sections 605) are present on processing unit 220.

Enlarged slider section 605 and/or sliders 604 may include electrical connectors configured to receive power from one or more power sources that are located within removable band sections. If power sources are located within both removable band sections with which processing unit 220 is to be connected, electrical connectors may be present on some or all enlarged slider sections 605 and/or sliders 604 on each side of processing unit 220. In some embodiments, even if a power source is only located within a single removable band section, electrical connectors may be present on enlarged slider section 605 and sliders 604 on each side of processing unit 220 to enable the ability for the user to reverse the orientation of processing unit 220 with respect to the removable bands.

When magnets 230-3 and 230-4 are coupled with magnets 230-1 and 320-2 and sliders 604 are fully inserted in slide paths 402 and 502, electrical connectors present on processing unit 220 may be properly aligned with electrical connectors present on removable band section 210-1 and removable band section 210-2, thus allowing power from battery 405 and/or 505 to be transmitted to processing unit 220.

Processing unit 220 may have two ways of displaying information: communication lights 602 (which can include communication light 602-1, communication light 602-2, and communication light 602-3), and display 603. Communication lights 602 may present various pieces of information or alerts to a user. For instance communication lights 602 may be illuminated in various patterns or using various colors to provide various pieces of information to the user. In other embodiments, a fewer or greater number of communication lights 602 may be present. Display 603 may provide more detailed information to the user, such as in the form of graphics and/or text.

Figure 6E:
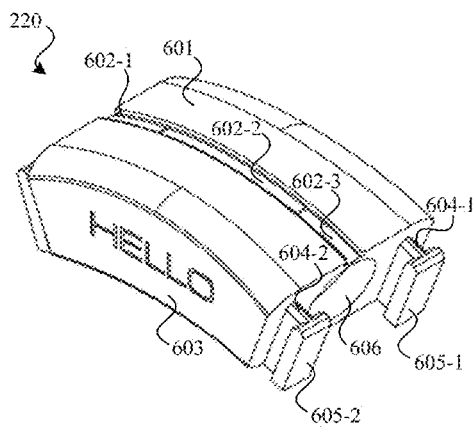
FIG. 6E illustrates a bottom view of an embodiment of a processing unit of a magnetically-coupled multiple piece band.
Figure 6E:
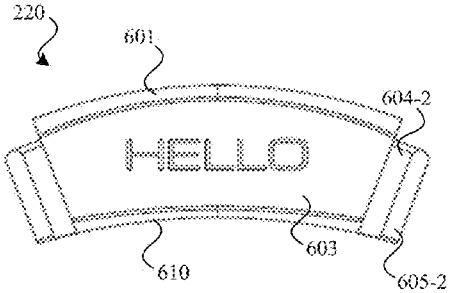
Figure 6E:
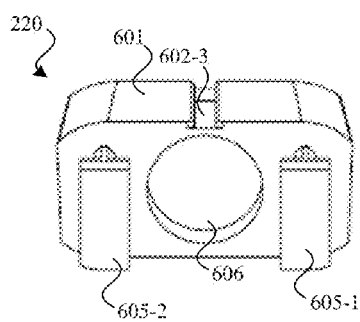
Figure 6E:
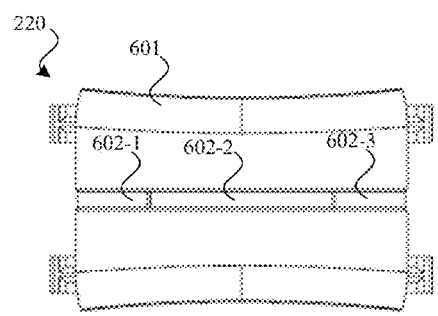
Figure 6E:
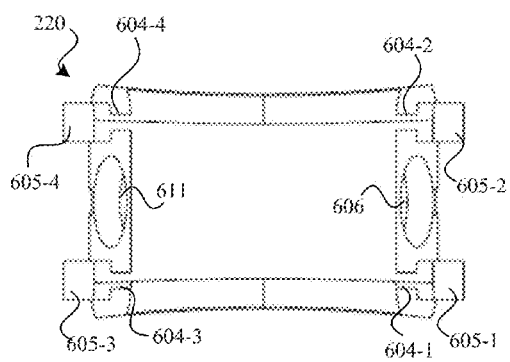

FIG. 6B illustrates a side view of processing unit 220 of an MMTD. As can be seen in FIG. 6B, processing unit 220 may be curved such that it better conforms to a user's wrist. Inner surface 610 may have a curve which may allow processing unit 220 to sit well on the user's wrist. FIG. 6C illustrates another side view of processing unit 220 of an MMTD. FIG. 6D illustrates a top view of processing unit 220 and FIG. 6E illustrates a bottom view of processing unit 220 of an MMTD. In FIG. 6E, both recessed magnet housings (606 and 611) of processing unit 220 are visible. Similarly, all four sliders (604-1, 604-2, 604-3, and 604-4) with associated enlarged slider sections (605-1, 605-2, 605-3, and 605-4) are visible.

Figure 7A:
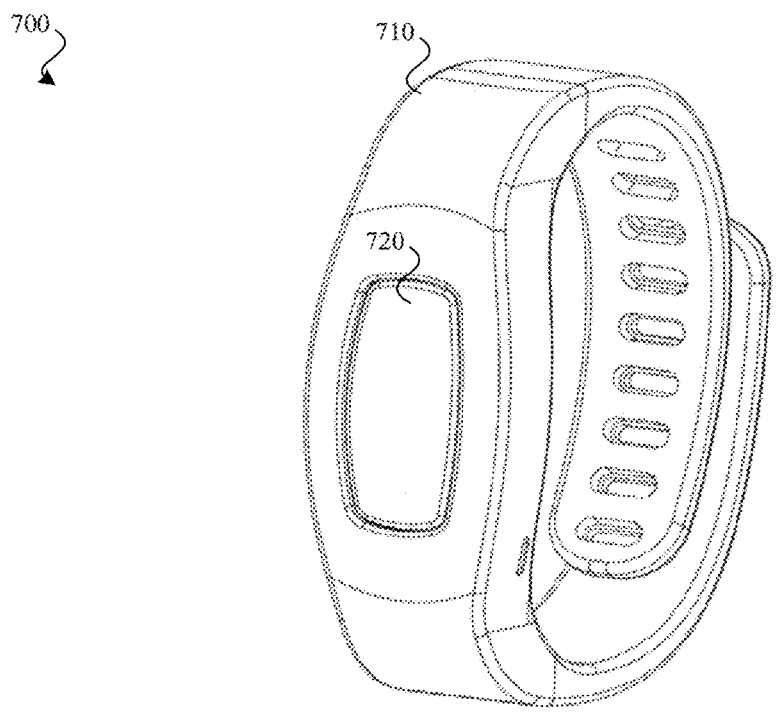
FIG. 7A illustrates an angled view of an embodiment of a removable component tracker device.
Figure 7B:
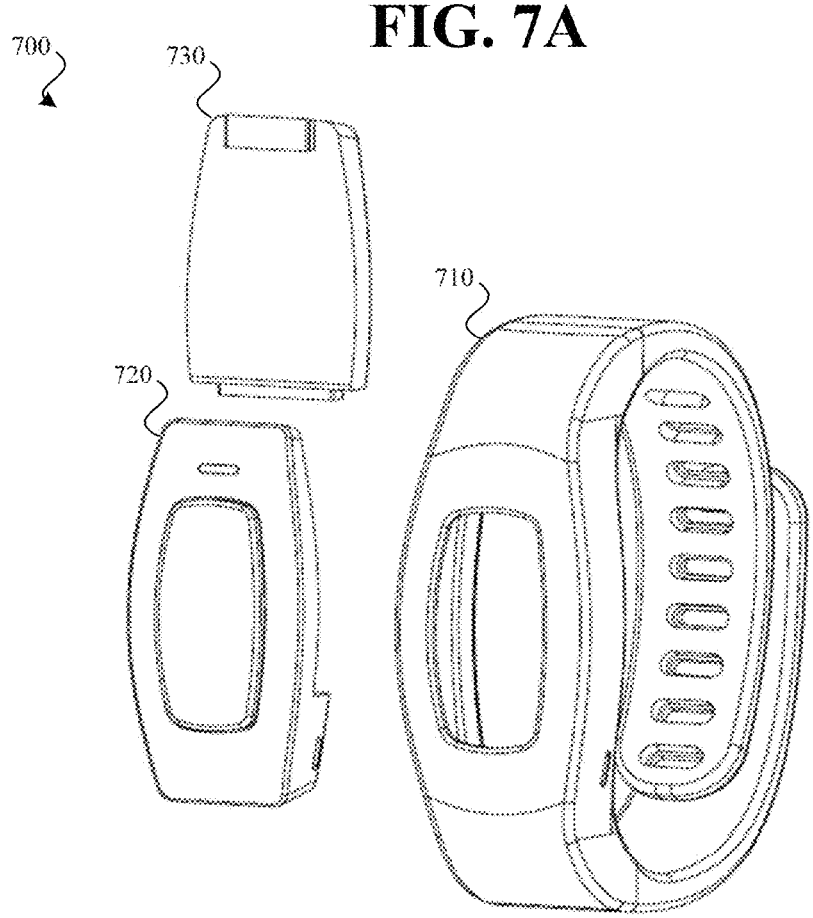
FIG. 7B illustrates an exploded view of an embodiment of a removable component tracker device.

In another embodiment of a tracker device, a battery unit is first removably attached with a processing unit while the two components are separated from a flexible band housing. Once the battery unit is connected with the processing unit, the combined unit may be inserted into the flexible band housing. In some embodiments, the combined unit may be inserted in other forms of housing, such as a pendant (such as pendant 150 of FIG. 1) for a user to wear around his neck. FIG. 7A illustrates an angled view of a removable component tracker device 700 in which all components (battery unit, processing unit, and flexible band housing) are assembled. Removable component tracker device 700 represents a possible implementation of components of tracker device system 100 of FIG. 1. In this assembled position, removable component tracker device 700 may be suitable to be attached to a user's wrist or ankle. FIG. 7B illustrates an exploded view of a removable component tracker device 700. In FIG. 7B, flexible band housing 710 (which corresponds to wristband 110), processing unit 720 (which corresponds to processing unit 120), and battery unit 730 (which corresponds to power source 130) are present. Each of these components are detailed in FIGS. 8A-13B.

Figure 8A:
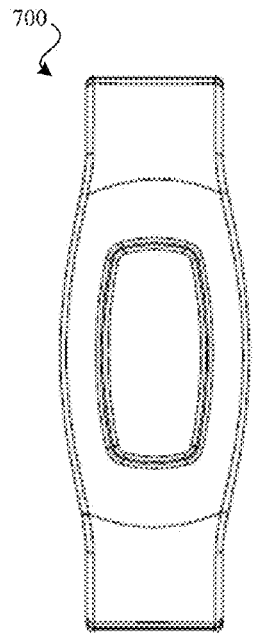
FIG. 8A illustrates a top view of an embodiment of a removable component tracker device.
Figure 8B:
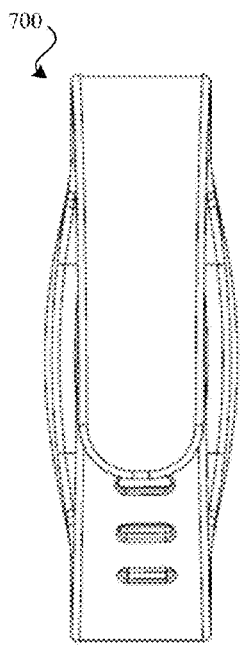
FIG. 8B illustrates a bottom view of an embodiment of a removable component tracker device.
Figure 8C:
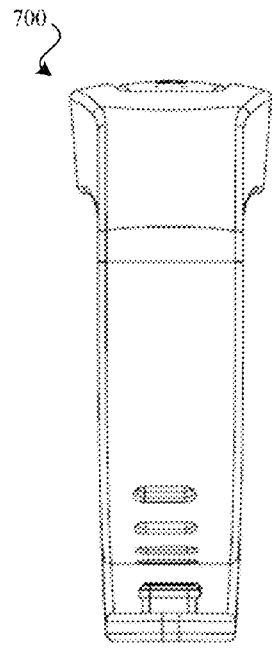
FIG. 8C illustrates a first side view of an embodiment of a removable component tracker device.
Figure 8D:
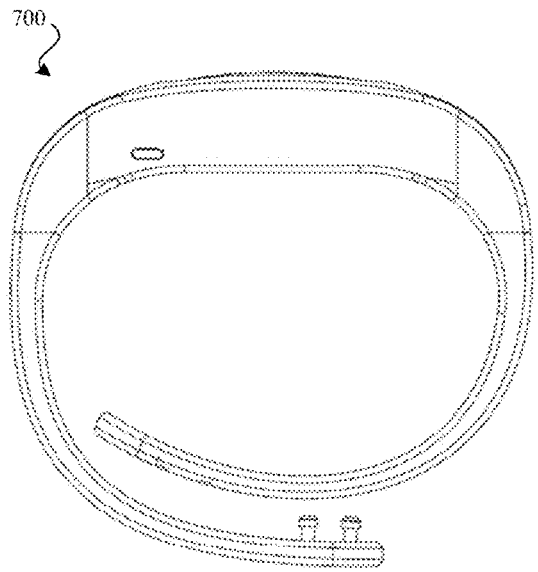
FIG. 8D illustrates a second side view of an embodiment of a removable component tracker device.
Figure 9A:
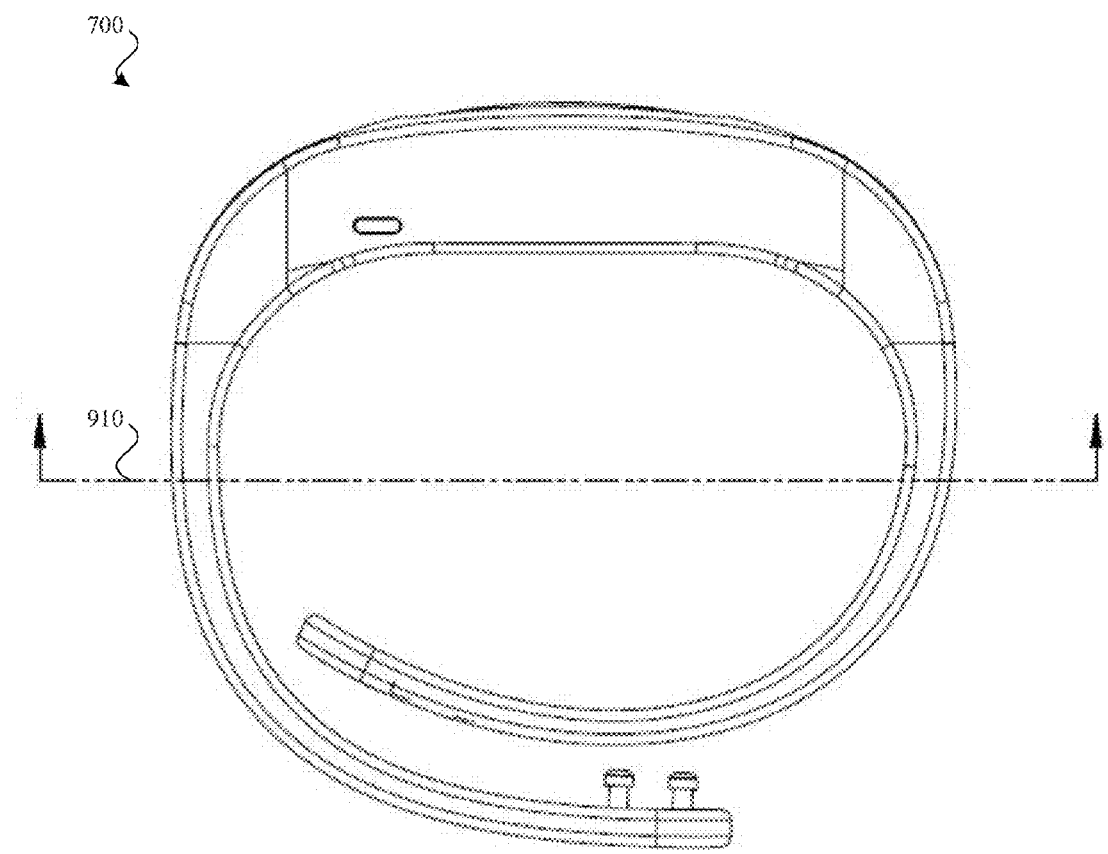
FIG. 9A illustrates the second side view of FIG. 8D with an indication of a cross section.
Figure 9B:
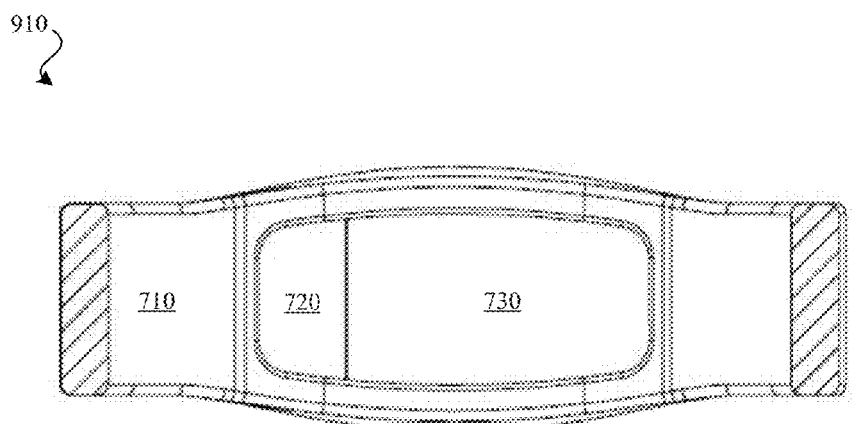
FIG. 9B illustrates the cross section denoted in FIG. 9A.

FIG. 8A illustrates a top view of a removable component tracker device with the battery unit, processing unit, and flexible band housing assembled together. FIG. 8B illustrates a bottom view of a removable component tracker device. FIG. 8C illustrates a first side view of a removable component tracker device. FIG. 8D illustrates a second side view of a removable component tracker device. Similarly to FIG. 8A, removable component tracker device 700 is illustrated with the battery unit, processing unit, and flexible band housing assembled together in FIGS. 8B-8D. FIG. 9A illustrates the second side view of FIG. 8D with an indication of a cross section 910. FIG. 9B illustrates cross section 910 denoted in FIG. 9A. As can be seen in FIG. 9B, portions of a bottom surface of battery unit 730 and processing unit 720 may remain visible when installed within flexible band housing 710.

Figure 10A:
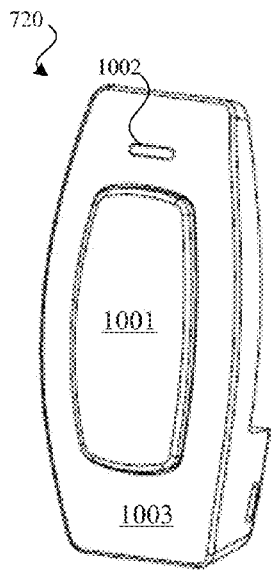
FIG. 10A illustrates an angled view of an embodiment of a processing unit of a removable component tracker device.
Figure 10B:
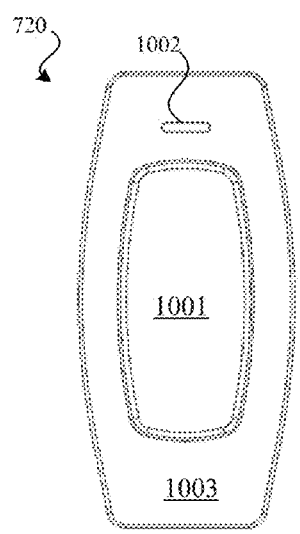
FIG. 10B illustrates a top view of an embodiment of a processing unit of a removable component tracker device.
Figure 10C:
FIG. 10C illustrates a bottom view of an embodiment of a processing unit of a removable component tracker device.
Figure 10D:
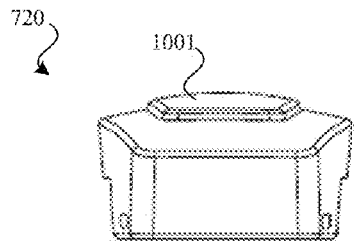
FIG. 10D illustrates a first side view of an embodiment of a processing unit of a removable component tracker device.

FIG. 10A illustrates an angled view of an embodiment of processing unit 720 of a removable component tracker device. FIG. 10B illustrates a top view of an embodiment of processing unit 720 of a removable component tracker device. FIG. 10C illustrates a bottom view of an embodiment of processing unit 720 of a removable component tracker device. FIG. 10D illustrates a first side view of an embodiment of processing unit 720 of a removable component tracker device. Present on a top surface (which faces away from a user's wrist when installed in a flexible band housing) of processing unit 720 may be display 1001 and communication light 1002. Processing unit 720 may have two ways of displaying information: communication light 1002 and display 1001. Communication light 1002 may present various pieces of information or alerts to a user. For instance, communication light 1002 may be illuminated in various patterns or using various colors to provide various pieces of information to the user. In other embodiments, greater numbers of communication lights may be present. Display 1001 may provide more detailed information to the user, such as in the form of graphics and/or text. Display 1001 may be raised or protrude from a surface of housing 1003 of processing unit 720. By display 1001 being raised, when coupled with flexible band housing 710, raised display 1001 may extend into or through a top window opening on flexible band housing 710. In some embodiments, rather than display 1001 being present, only housing 1003 may be present possibly with fixed text present on housing 1003. Such an arrangement may be desirable if an active display is not needed. In some embodiments, such as a device focused on two-way communication, display 1001 may be replaced with a button that enables the two-way communication link between the wearer and a remote person.

In some embodiments, rather than display 1001 being present, this region is a button. Such a large button may be easily pressed by an elderly person. In response to pushing or holding down of such a button, an emergency signal may be transmitted to a caretaker.

Figure 10E:
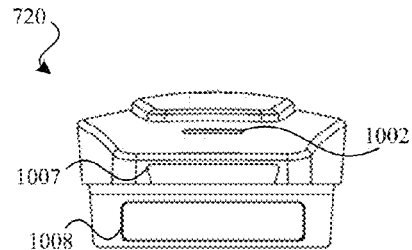
FIG. 10E illustrates a second side view of an embodiment of a processing unit of a removable component tracker device.

FIG. 10E illustrates a second side view of an embodiment of processing unit 720 of a removable component tracker device. Visible in FIG. 10D is electrical connector 1008. Electrical connector 1008 may serve to connect processing unit 720 with a battery unit or some other form of power supply. When processing unit 720 has been removed from flexible band housing 710, a battery unit may then be detached from electrical connector 1008 of processing unit 720 (if such a battery unit is connected) and another better unit may be attached to electrical connector 1008 of processing unit 720 before processing unit 720 and the battery unit are reinstalled into flexible band housing 710. Therefore, processing unit 720 and battery unit 730 are installed as a single unit into flexible band housing 710.

Also visible in FIG. 10E is tab lock 1007. Tab lock 1007 may serve to receive a tab of a battery unit when a battery unit is coupled with electrical connector 1008. Tab lock 1007 may serve to help couple the battery unit with processing unit 720. Therefore, the battery unit may have two points of connection to processing unit 720: electrical connector 1008 and tab lock 1007.

Figure 10F:
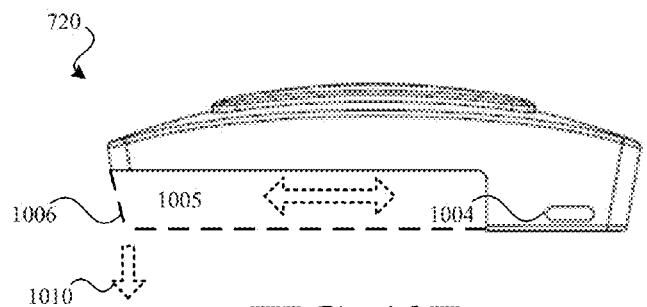
FIG. 10F illustrates a third side view of an embodiment of a processing unit of a removable component tracker device.

FIG. 10F illustrates a third side view of an embodiment of processing unit 720 of a removable component tracker device. Visible from the third side view of processing unit 720 is speaker opening 1004. Speaker opening 1004 may facilitate sound being output from an underlying speaker. The underlying speaker, in combination with a microphone of processing unit 720 may enable two-way audio communication. For example, a user may push a button (which may be in place of display 1001) to initiate communication and may then have a two-way conversation using an on-board microphone and a speaker that output sounds through speaker opening 1004. In FIG. 10F, arrow 1005 shows how a battery unit can be attached and detached from processing unit 720. Therefore, as illustrated, it can be seen that a battery unit fits into a recessed region of processing unit 720. When a battery unit is coupled with processing unit 720, the battery unit may be shaped such as to match an exterior contour of processing unit 720 and fit in recessed region 1006.

Figure 11A:
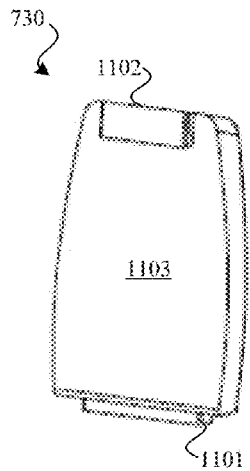
FIG. 11A illustrates an angled view of an embodiment of a battery unit of a removable component tracker device.
Figure 11B:
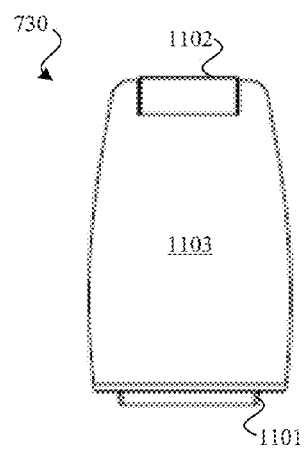
FIG. 11B illustrates a top view of an embodiment of a battery unit of a removable component tracker device.
Figure 11C:
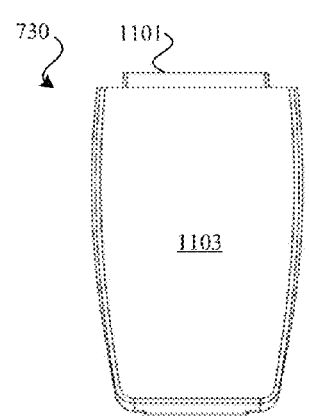
FIG. 11C illustrates a bottom view of an embodiment of a battery unit of a removable component tracker device.
Figure 11D:
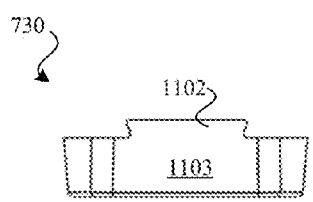
FIG. 11D illustrates a first side view of an embodiment of a battery unit of a removable component tracker device.

FIG. 11A illustrates an angled view of an embodiment of battery unit 730 of a removable component tracker device. While FIGS. 11A-11F refer to a battery unit, such embodiments may take another form of power source, such as a capacitor. FIG. 11B illustrates a top view of an embodiment of battery unit 730 of a removable component tracker device. FIG. 11C illustrates a bottom view of an embodiment of battery unit 730 of a removable component tracker device. FIG. 11D illustrates a first side view of an embodiment of battery unit 730 of a removable component tracker device. Visible on battery unit 730 is tab 1102 and electrical connector 1101. Electrical connector 1101 may serve to electrically connect a battery unit 730 with processing unit 720. Via electrical connector 1101, when connected with a processing unit, battery unit 730 may supply the processing unit with power. When disconnected from a processing unit, it may be possible to charge battery unit 730 via electrical connector 1101 by using a recharger, such as recharger 140 of FIG. 1. Housing 1103 of battery unit 730 may be made of a rigid or semi-rigid material, such as a hard plastic.

Tab 1102 may be a protruding portion of housing 1103. Tab 1102 may mechanically connect with a tablet lock such as tab lock 1007 of FIG. 10E. When battery unit 730 is attached with processing unit 720, electrical connector 1008 of processing unit 720 may connect with electrical connector 1000 and one of battery units 730. At the same time, tab 1102 of battery unit 730 may connect with tab lock 1007 of processing unit 720. When tab 1102 is connected with tab lock 1007, movement of battery unit 730 in the direction indicated by arrow 1010 may be prevented.

Figure 11E:
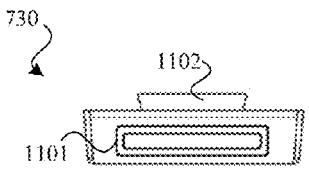
FIG. 11E illustrates a second side view of an embodiment of a battery unit of a removable component tracker device.
Figure 11F:
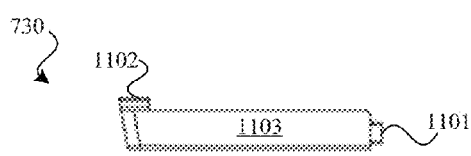
FIG. 11F illustrates a third side view of an embodiment of a battery unit of a removable component tracker device.

As detailed in relation to FIG. 10F, battery unit 730 may be shaped to fit in a recessed region 1006 of processing unit 720. FIG. 11E illustrates a second side view of an embodiment of battery unit 730 of a removable component tracker device. FIG. 11F illustrates a third side view of an embodiment of battery unit 730 of a removable component tracker device.

Figure 12A:
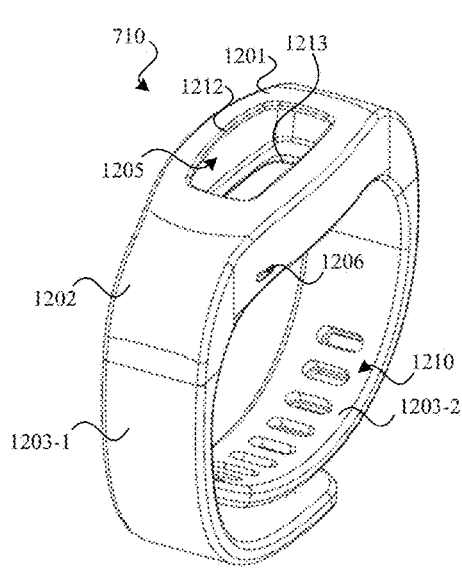
FIG. 12A illustrates an angled view of an embodiment of a flexible band housing of a removable component tracker device.

FIG. 12A illustrates an angled view of an embodiment of flexible band housing 710 of a removable component tracker device. Flexible band housing 710 may include component housing 1201 which forms component cavity 1205, band section 1202, and flexible band section 1203. Component housing 1201 may be composed of a rigid, semi-rigid, or flexible material. Component housing 1201 may form component cavity 1205 in which the components of processing unit 720 and battery unit 730 are inserted. Component cavity 1205 as formed by component housing 1201 may have two distinct windows: a bottom window 1213 (which is proximate to a user's wrist) that allows processing unit 720 and battery unit 730 to be installed (while coupled together) and removed (while coupled together), and top window 1212, which faces away from the user's wrist and allows display 1001 to be visible to user wearing flexible band housing 710.

Band section 1202 and flexible band section 1203 may be composed of the same material as component housing 1201. For instance, all three sections may be made from a same flexible material, such as silicone or rubber. Alternatively, these three sections may be made from two or three different materials. In some embodiments, component housing 1201 is made from a rigid or semi-rigid material, band section 1202 is made from a semi-rigid or flexible material, and flexible band section 1203 is made from a flexible material.

Port 1206, as defined by component housing 1201, may allow sounds from an underlying speaker (audio output 126) to more easily be projected into the ambient environment to be heard by a user while processing unit 720 is installed within flexible band housing 710. For instance, port 1206 may be useful when being used as a two-way communication device.

Figure 12B:
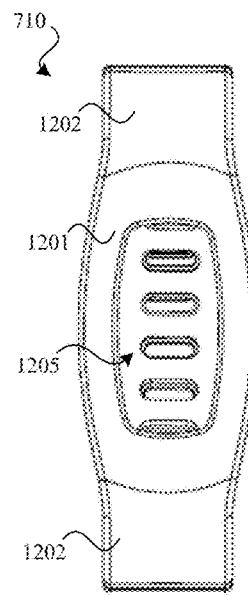
FIG. 12B illustrates a top view of an embodiment of a flexible band housing of a removable component tracker device.
Figure 12C:
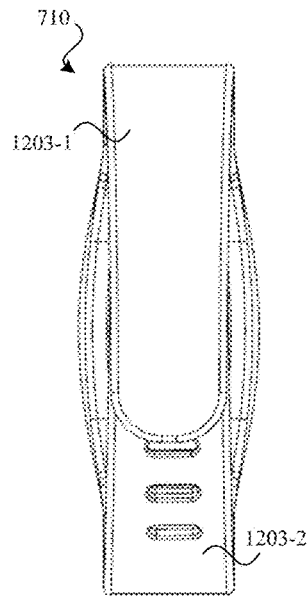
FIG. 12C illustrates a bottom view of an embodiment of a flexible band housing of a removable component tracker device.
Figure 12D:
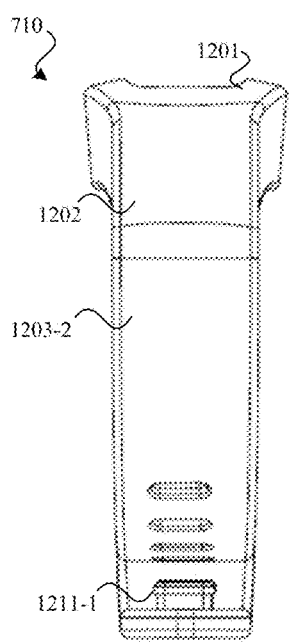
FIG. 12D illustrates a side view of an embodiment of a flexible band housing of a removable component tracker device.

FIG. 12B illustrates a top view of an embodiment of flexible band housing 710 of a removable component tracker device. In FIG. 12B, it can be seen that component housing 1201 increases in width towards its center, away from band section 1202. FIG. 12C illustrates a bottom view of an embodiment of flexible band housing 710 of a removable component tracker device. FIG. 12D illustrates a side view of an embodiment of flexible band housing 710 of a removable component tracker device. Present on flexible band section 1203-1 may be one or more coupling pegs 1211 (of which a single coupling peg 1211-1 is visible in FIG. 12D) that can be used to adjust the total circumference of flexible band hosing 710 to accommodate different wrist (or ankle) circumferences. Coupling pegs 1211 may be removably inserted input coupling holes 1210 present on flexible band section 1203-2. It should be understood that other forms of buckling or temporary coupling arrangements may be used to connect flexible band section 1203-1 with flexible band section 1203-2.

Figure 13A:
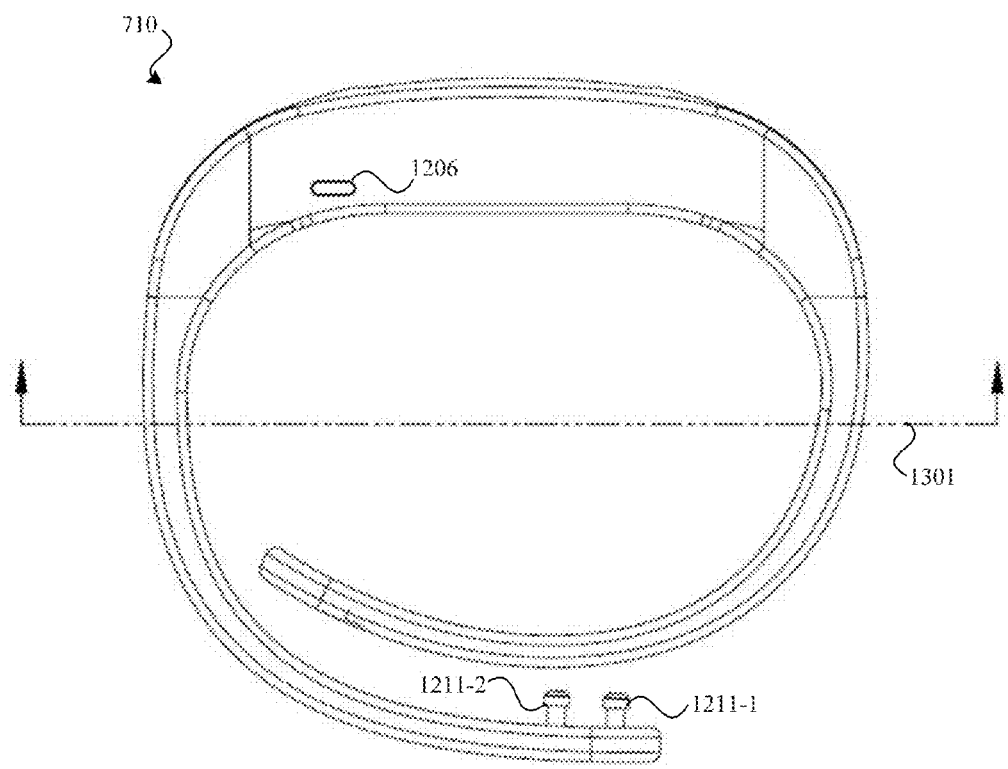
FIG. 13A illustrates a second side view of an embodiment of a flexible band housing of a removable component tracker with an indication of a cross section.
Figure 13B:
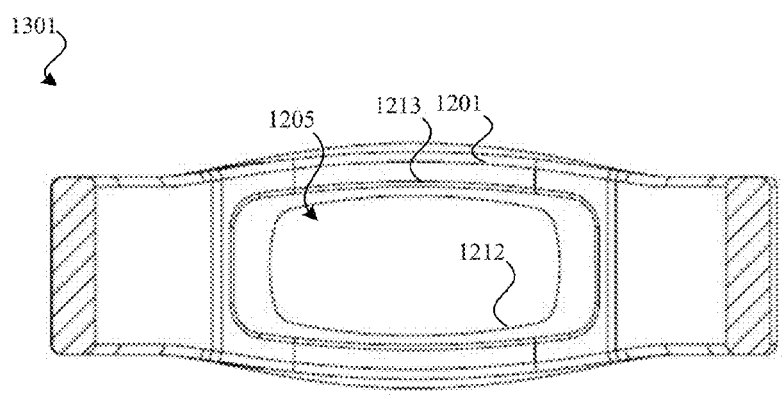
FIG. 13B illustrates the cross section denoted in FIG. 13A.

FIG. 13A illustrates a second side view of an embodiment of a flexible band housing of a removable component tracker with an indication of cross section 1301. In FIG. 13A, coupling peg 1211-1 and coupling peg 1211-2 are visible. In other embodiments, a greater or fewer number of coupling pegs may be present or an alternative way of removably coupling flexible band section 1203-1 with flexible band section 1203-2 may be used. FIG. 13B illustrates cross section 1301 denoted in FIG. 13A. In FIG. 13B, bottom window 1213 is visible. Bottom window 1213 may be larger than top window 1212 present on component housing 1201. Bottom window 1213 may allow processing unit 720 which is coupled with battery unit 730, to be installed as a unit within component cavity 1205. When inserting the unit composed of processing unit 720 and battery unit 730, component housing 1201 may be flexed by user to insert the combined unit through bottom window 1213. Since the combined unit is installed through bottom window 1213, installation or removal of the combined unit may only occur when flexible band housing 710 is removed from the user's wrist. Top window 1212 may be sized to not be large enough to allow the combined unit of processing unit 720 and battery unit 730 to be inserted or removed from component cavity 1205. In some embodiments, if component housing 1201 is made of a rigid material, a region around bottom window 1213 may be present that is made of a different, more flexible material to allow the combined unit of processing unit 720 and battery unit 730 to be installed and removed from component cavity 1205.

Figure 14A:
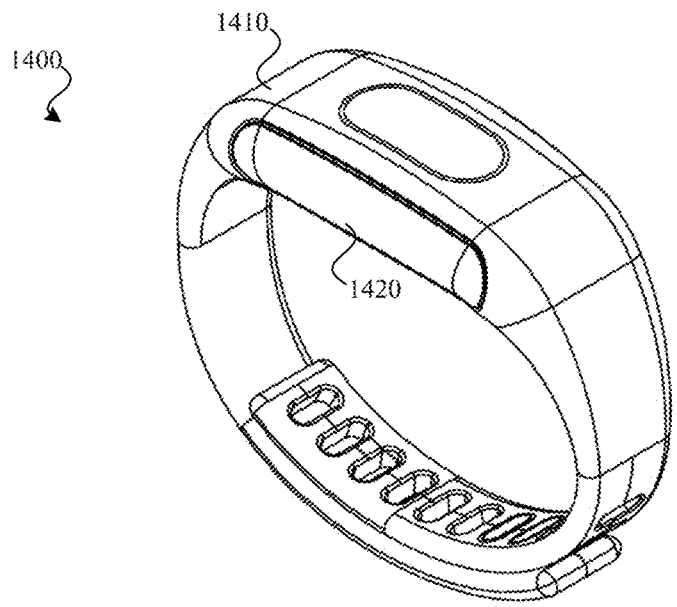
FIG. 14A illustrates an angled view of an embodiment of a slide-coupled tracker device.
Figure 14B:
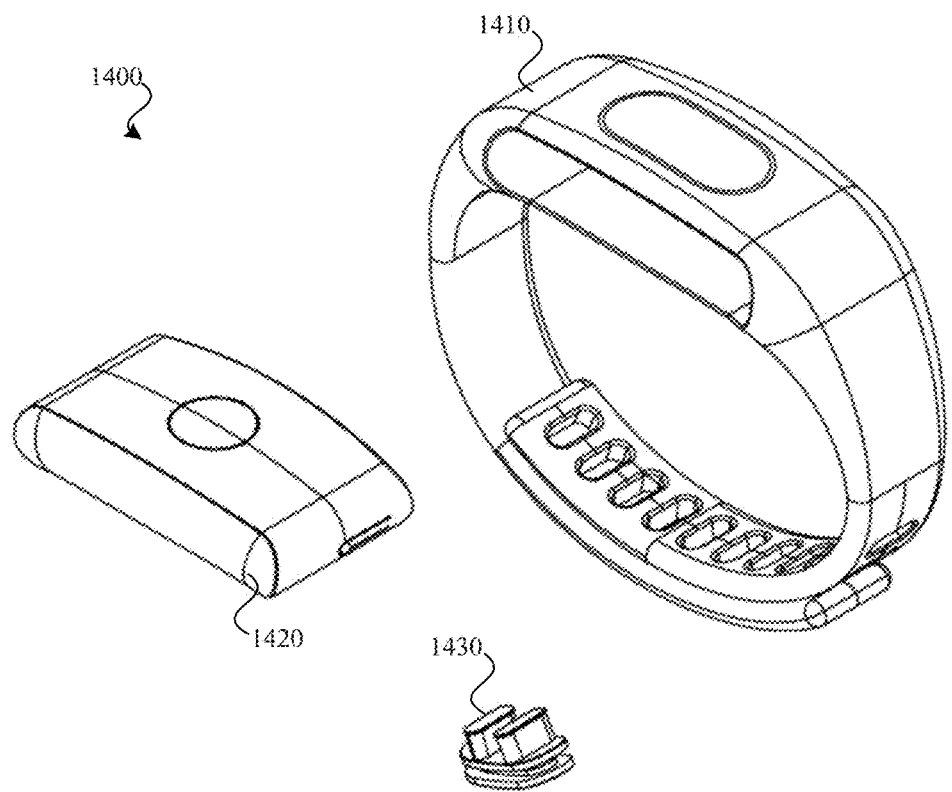
FIG. 14B illustrates an exploded angled view of an embodiment of a slide-coupled tracker device.

In another embodiment of the tracker device of FIG. 1, processing unit 120 may be permanently coupled with power source 130 (e.g., one or more batteries) in a single housing. Wristband 110 may be made of a single piece of material and may be removably coupled with the combined processing and battery unit by the combined processing and battery unit being slid into an opening in a housing present on wristband 110. FIG. 14A illustrates an angled view of an embodiment of a slide-coupled tracker device (SCTD) 1400. FIG. 14B illustrates an exploded angled view of an embodiment of a slide-coupled tracker device. SCTD 1400 represents an embodiment of tracker device 100 of FIG. 1. SCTD 1400 may include: slide-coupled single-piece wristband 1410, combined processing and battery unit 1420, and wristband clasp 1430. Both combined processing and battery unit 1420 and wristband clasp 1430 may be removably coupled with single-piece wristband 1410. Each of these components are detailed in relation to the figures that follow.

Figure 15D:
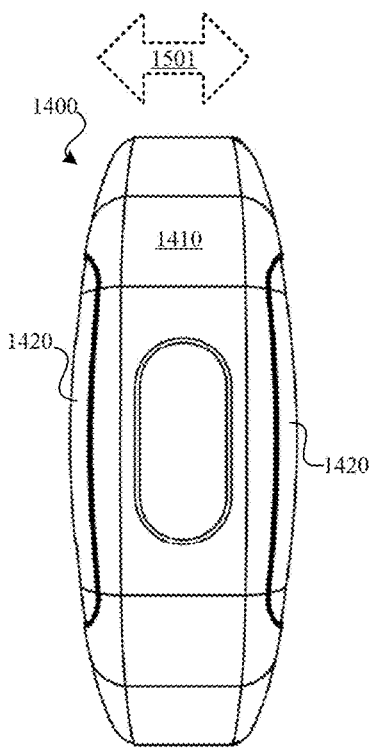
FIG. 15D illustrates another side view of an embodiment of a slide-coupled tracker device.
Figure 15D:
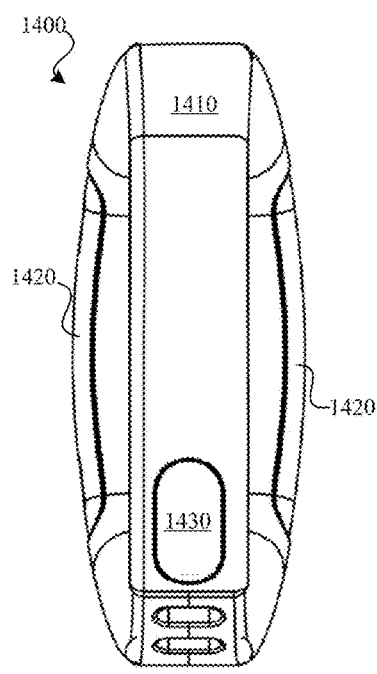
Figure 15D:
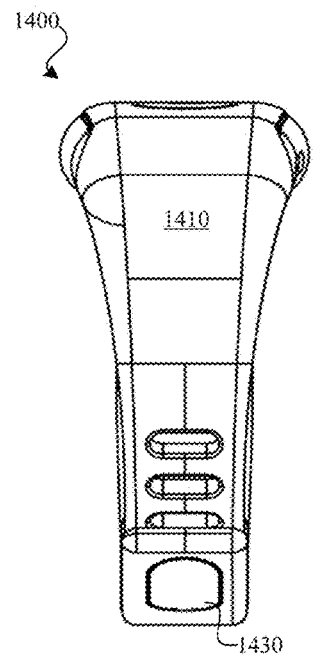
Figure 15D:
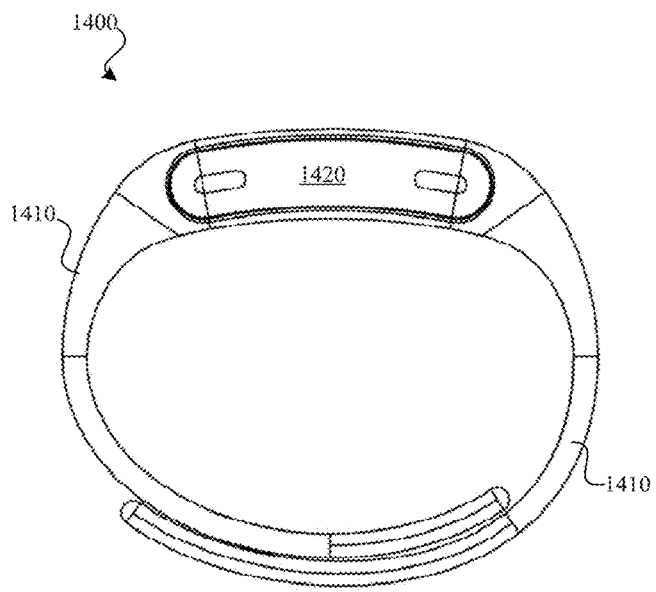

FIG. 15A illustrates a top view of an embodiment of a SCTD with combined processing and battery unit 1420 and wristband clasp 1430 coupled together. FIG. 15B illustrates a bottom view of an embodiment of a SCTD with combined processing and battery unit 1420 and wristband clasp 1430 coupled together. FIG. 15C illustrates a side view of an embodiment of a SCTD with combined processing and battery unit 1420 and wristband clasp 1430 coupled together. FIG. 15D illustrates another side view of an embodiment of a SCTD with combined processing and battery unit 1420 and wristband clasp 1430 coupled together. When combined processing and battery unit 1420 is inserted within a housing of single-piece wristband 1410, a portion of combined processing and battery unit 1420 may remain visible on either side of single-piece wristband 1410 as seen in FIG. 15A. A user may be able to remove single piece processing and battery unit 1420 from single-piece wristband 1410 by pushing or pulling combined processing and battery unit 1420 in accordance with arrow 1421. In FIG. 15C, it can be seen that a top portion of single-piece wristband 1410 is flared to accommodate combined processing and battery unit 1420.

Figure 16A:
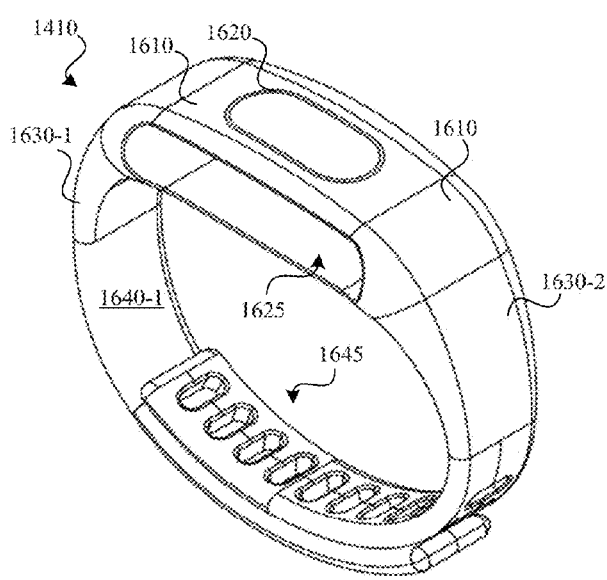
FIG. 16A illustrates an angled top view of an embodiment of a slide-coupled single-piece wristband.
Figure 16B:
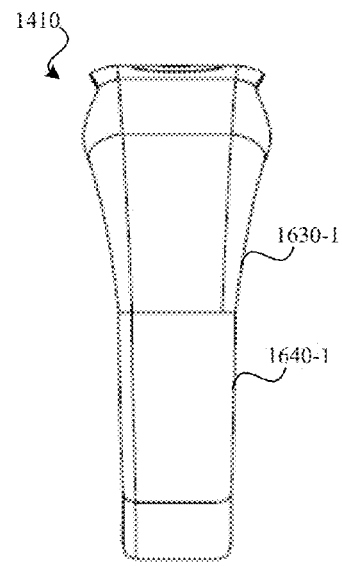
FIG. 16B illustrates a side view of an embodiment of a slide-coupled single-piece wristband.
Figure 16C:
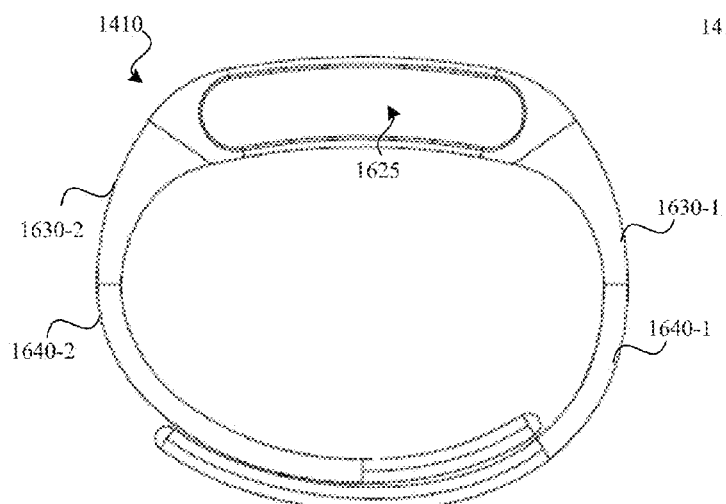
FIG. 16C illustrates a second view of an embodiment of a slide-coupled single-piece wristband.

FIG. 16A illustrates an angled top view of an embodiment of slide-coupled single-piece wristband 1410. FIG. 16B illustrates a side view of an embodiment of slide-coupled single-piece wristband 1410. FIG. 16C illustrates a second view of an embodiment of slide-coupled single-piece wristband 1410. The single-piece wristband 1410 may be worn by user when a combined processing and battery unit 1420 is and is not installed. Further, single-piece wristband 1410 may permit a user to remove and install processing and battery unit 1420 while single-piece wristband 1410 is being worn by the user. Single-piece wristband 1410 may include: housing 1610, slot 1625, wristband sections 1630, wristband sections 1640, clasp coupling holes 1645, and clasp mounting bracket 1650.

Housing 1610 may form slot 1625. Slot 1625 may be configured to receive a combined processing and battery unit from either side of housing 1610. Slot 1625 may be sized such that friction is present to hold the combined processing and battery unit in place within housing 1610. Present on a top service of housing 1610 may be window 1620. Window 1620 may allow a user to see if combined processing and battery unit 1420 is present within slot 1625 and/or may allow a user to view a display screen, press a button, and/or status lights present on combined processing and battery unit 1420. In some embodiments, rather than window 1620 being present, housing 1610 may be extended to cover the area defined by window 1620 and, possibly, text or a logo may be permanently presented on the housing at such a location. A button may be present on a top surface of combined processing and battery unit 1420 to allow a user to enable a two-way communication link with a remote person.

Figure 16D:
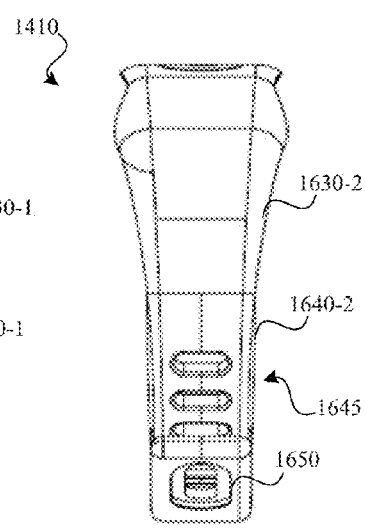
FIG. 16D illustrates a third side view of an embodiment of a slide-coupled single-piece wristband.
Figure 16E:
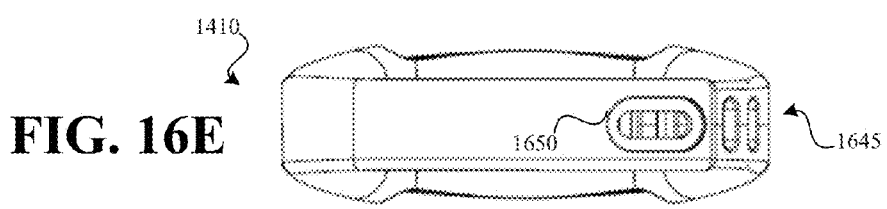
FIG. 16E illustrates a bottom view of an embodiment of a slide-coupled single-piece wristband.

FIG. 16D illustrates a third side view of an embodiment of a slide-coupled single-piece wristband. FIG. 16E illustrates a bottom view of an embodiment of a slide-coupled single-piece wristband. Wristband sections 1630 (which includes wristband section 1630-1 and wristband section 1630-2) may be made from a flexible or semi rigid material. Housing 1610, in contrast, may be made from a rigid material. In some embodiments, housing 1610 is made from the same material as wristband sections 1630; that is, both components may be made from a semi-rigid or flexible material. Wristband sections 1640 (which include wristband section 1640-1 and wristband section 1640-2) may allow a user to expand or contract single-piece wristband 1410 to fit wrists or ankles of different sizes. Coupling holes 1645 may be configured to receive a wristband clasp 1430.

A wristband clasp may be configured to be inserted into clasp mounting bracket 1650 present on wristband section 1640-1. A portion of the wristband clasp may pass through clasp mounting bracket 1650 and removably couple with one or more coupling holes 1645 present on wristband section 1640-2. A user may adjust the particular coupling holes 1645 to which clasp mounting bracket 1650 couples in order to control an inner circumference of slide-coupled single-piece wristband 1410.

Figure 17A:
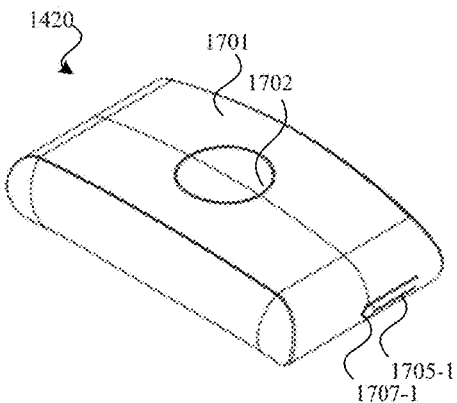
FIG. 17A illustrates an angled top view of an embodiment of a combined processing and battery unit.
Figure 17B:
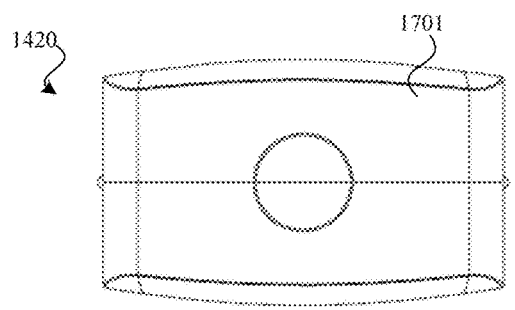
FIG. 17B illustrates a top view of an embodiment of a combined processing and battery unit.

For SCTD 1400, a processing unit (e.g., processing unit 120 of FIG. 1) and one or more batteries (e.g., power source 130) may be permanently housed together. As such, to charge combined processing and battery unit 1420, combined processing and battery unit 1420 may be removed from single-piece wristband 1410 and coupled with recharger 140. Combined processing and battery unit 1420 may also be coupled with a pendant 150 and worn around a user's neck. FIG. 17A illustrates an angled top view of an embodiment of a combined processing and battery unit. Combined processing and battery unit 1420 may include: housing 1701, display 1702, electrical contacts 1703, lock flex sections 1705, and lock protrusions 1707. FIG. 17B illustrates a top view of an embodiment of a combined processing and battery unit.

Housing 1701 may house a processing unit and one or more battery units. Such processing unit and one or more battery units may not be separated by user from each other. Housing 1701 may be a rigid material and may be waterproof to protect the combined processing and battery unit. In some embodiments, display 1702 is present. Display 1702 may present information to user through window 1620 when installed in single-piece wristband 1410. Further, display 1702 may be able to present information to a user when combined processing and battery unit 1420 is not installed in single-piece wristband 1410. In some embodiments, rather than display 1702 being present, a button may be present that can be depressed by a user to enable a two-way communication link with a remote person.

Figure 17C:
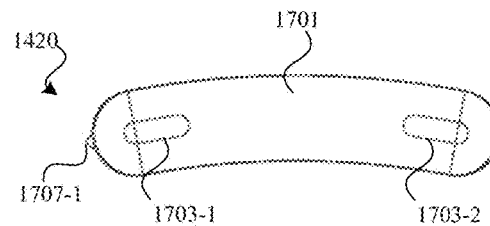
FIG. 17C illustrates a side view of an embodiment of a combined processing and battery unit.

FIG. 17C illustrates a side view of an embodiment of combined processing and battery unit 1420. Present on the side of combined processing and battery unit 1420 may be electrical connectors 1703 (which include electrical connectors 1703-1 and electrical connectors 1703-2). Electrical connectors 1703 may permit the one or more batteries present within combined processing and battery unit 1420 to be recharged. Combined processing and battery unit 1420 may be removed from single-piece wristband 1410 and installed in a recharger that provides electricity to electrical connectors 1703. In some embodiments, electrical connectors 1703 may be used for data transfer via a wired connection with a computerized device in addition to being used for charging.

Figure 17D:
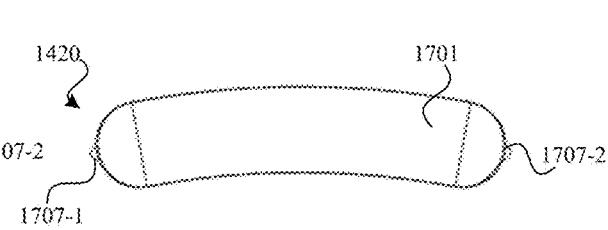
FIG. 17D illustrates a second side view of an embodiment of a combined processing and battery unit.
Figure 17E:
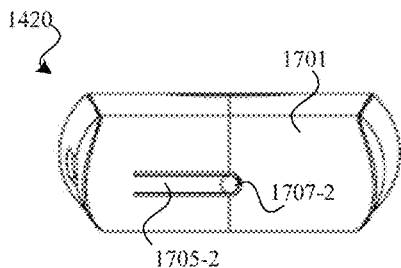
FIG. 17E illustrates a third side view of an embodiment of a combined processing and battery unit.
Figure 17F:
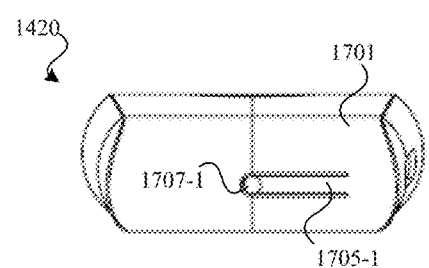
FIG. 17F illustrates a fourth side view of an embodiment of a combined processing and battery unit.
Figure 17G:
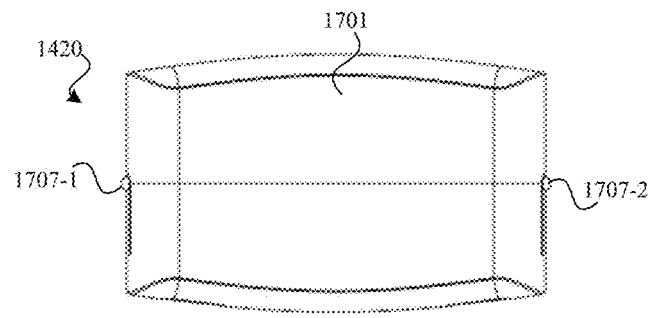
FIG. 17G illustrates a bottom view of an embodiment of a combined processing and battery unit.

FIG. 17D illustrates a second side view of an embodiment of combined processing and battery unit 1420. FIG. 17E illustrates a third side view of an embodiment of combined processing and battery unit 1420. FIG. 17F illustrates a fourth side view of an embodiment of combined processing and battery unit 1420. FIG. 17G illustrates a bottom view of an embodiment of combined processing and battery unit 1420. Lock flex sections 1705 (which include lock flex section 1705-1 and lock flex section 1705-2) and lock protrusions 1707 (which include lock protrusion 1707-1 and lock protrusion 1707-2) may help combined processing and battery unit 1420 to remain in place within slot 1625. When a user inserts combined processing and battery unit 1420 into slot 1625, the inner surface of housing 1610 which forms slot 1625 may exert inward pressure on lock protrusions 1707. Such pressure may cause lock flex sections 1705, which are permanently coupled with lock protrusions 1707, to flex inward. By lock flex sections 1705 flexing inward, lock protrusions 1707 may move towards an interior of housing 1701 allowing combined processing and battery unit 1420 to enter slot 1625. Present on the inner surface of housing 1610 which forms slot 625 may be lock receptacles that are configured to receive lock protrusions 1707. Lock receptacles may provide a recessed space for lock protrusions 1707 such that lock flex section 1705 can flex outward to or toward an unflexed position. By lock protrusion 1707 being seated in lock receptacles (which may be a circular recessed region centered on a sidewall of the inner surface of housing 1701 that forms slot 625), combined processing and battery unit 1420 may be held in place within slot 1625. If a user exerts sufficient pressure on combined processing and battery unit 1420, lock flex section 1705 may again be flexed inward and combined processing and battery unit 1420 may be removed from slot 1625 by lock protrusion 1707 being removed from lock receptacles located on the interior surface of housing 1701.

Figure 18A:
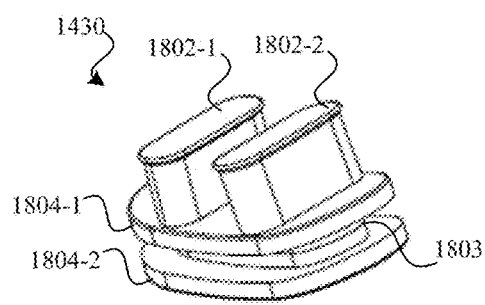
FIG. 18A illustrates an angled top view of an embodiment of a removable wristband clasp.
Figure 18B:
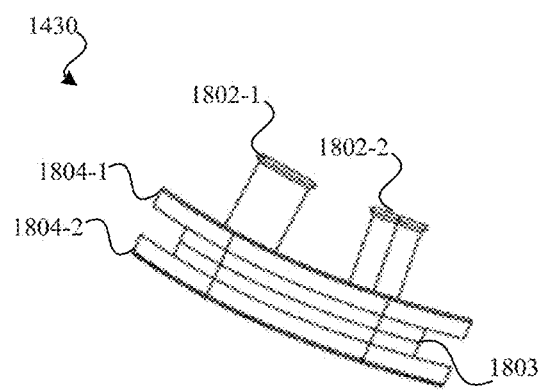
FIG. 18B illustrates a side view of an embodiment of a removable wristband clasp.
Figure 18C:
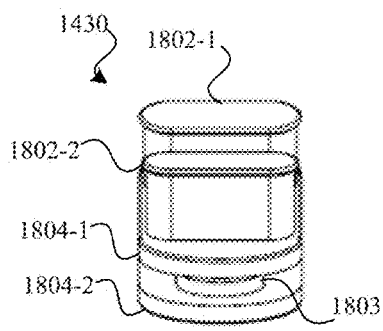
FIG. 18C illustrates a second side view of an embodiment of a removable wristband clasp.
Figure 18D:
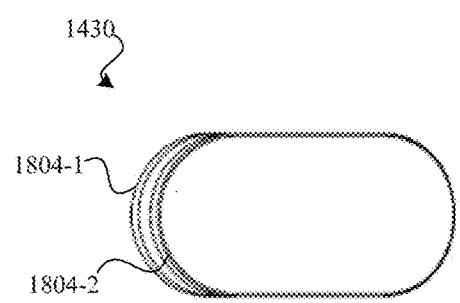
FIG. 18D illustrates a bottom view of an embodiment of a removable wristband clasp.

FIG. 18A illustrates an angled top view of an embodiment of removable wristband clasp 1430. FIG. 18B illustrates a side view of an embodiment of removable wristband clasp 1430. FIG. 18C illustrates a second side view of an embodiment of removable wristband clasp 1430. FIG. 18D illustrates a bottom view of an embodiment of removable wristband clasp 1430. Removable wristband clasp 1430 may include: pegs 1802, body 1803, and protrusion planes 1804. Pegs 1802 (which may include peg 1802-1 and peg 1802-2) may be inserted into coupling holes 1645 of wristband section 1630-2. In other embodiments, removable wristband clasp 1430 may have a fewer or greater number of pegs 1802. Tops of pegs 1802 may be flared such that when inserted in mounting holes of wristband section 1630-2, pegs 1802 remain in place until intentionally removed by user.

Body 1803 may be configured to be set in clasp mounting bracket 1650 such that protrusion plane 1804-1 seats on an inside of clasp mounting bracket 1650 (near a user's wrist) and protrusion plane 1804-2 seats on an outside of clasp mounting bracket 1650. A user may remove wristband clasp 1430 by flexing wristband clasp 1430 and/or clasp mounting bracket 1650; each of these components may be made of a semi-rigid or flexible material, thus allowing them to be flexed.

For the various detailed embodiments of FIGS. 2A-18D, features of one tracker device may be interchanged with another embodiment of a tracker device. For example, the magnetically-coupled processing unit of FIG. 2A may be used in conjunction with the one-piece band of FIG. 14A. As another example, the single unit that is formed by attaching the processing unit and battery unit of FIG. 7B may be used in place of the single processing and battery unit of FIG. 14B. Various other features may be interchanged among the embodiments.

Figure 19:
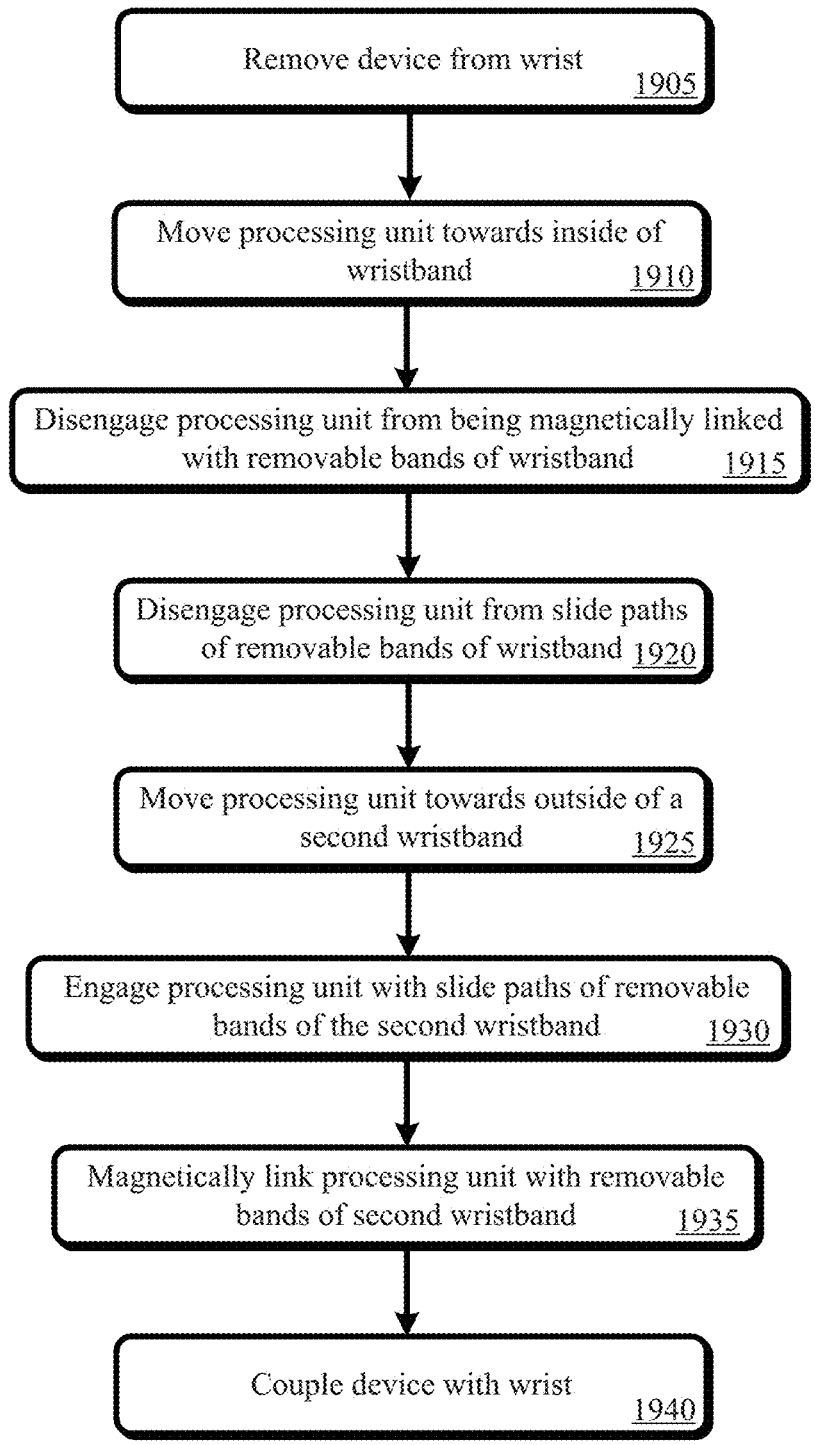
FIG. 19 illustrates an embodiment of a method for swapping power sources for a magnetically-coupled multi-piece tracker device.

Using the embodiments of FIGS. 2A-18D, various methods may be performed. FIG. 19 illustrates an embodiment of a method 1900 for swapping power sources for a magnetically-coupled multi-piece tracker device. Method 1900 may be performed using an embodiment of an MMTD from FIGS. 2A-6E or another similar tracker device. At block 1905, if the MMTD is being worn by a user, the user may first remove the MMTD from his wrist in order to swap out the battery (or other form of power source). At block 1910, once removed from the user's wrist, the user may move the processing unit of the MMTD toward an inside of the MMTD's wristband (which is at least approximately where the user's wrist resided while being worn). By the user moving the processing unit toward the center of the MMTD, the processing unit may be disengaged from being linked with the removable bands of the wristband at block 1915. Sliders of the processing unit may then disengage from slide paths at block 1920.

The processing unit may then be installed on one or more wristbands that house a battery that is charged. If only one section of the wristband houses a battery, only that section of the wristband may be swapped for a wristband section containing a charged battery. At block 1925, the processing unit may be moved towards the outside of the second wristband (or wristband that includes one section from the first wristband and a second section that includes a charged power source). The motion resulting from block 1925 may cause the processing unit to engage with the slide paths of the second wristband at block 1930. Further, this motion, at block 1935 may cause magnets of the processing unit and/or the wristband to engage, helping to snap the processing unit into the fully inserted position with the wristband. When fully inserted, various metallic contacts between one or both sections of the wristband may engage with metallic contacts of the processing unit to allow for power to be transferred from the battery of the wristband to the processing unit. In some embodiments, magnets may serve as one or more of the metallic contacts. At block 1940, the user may attach the MMTD to his wrist by fastening the band sections of the wristband to each other.

Figure 20:
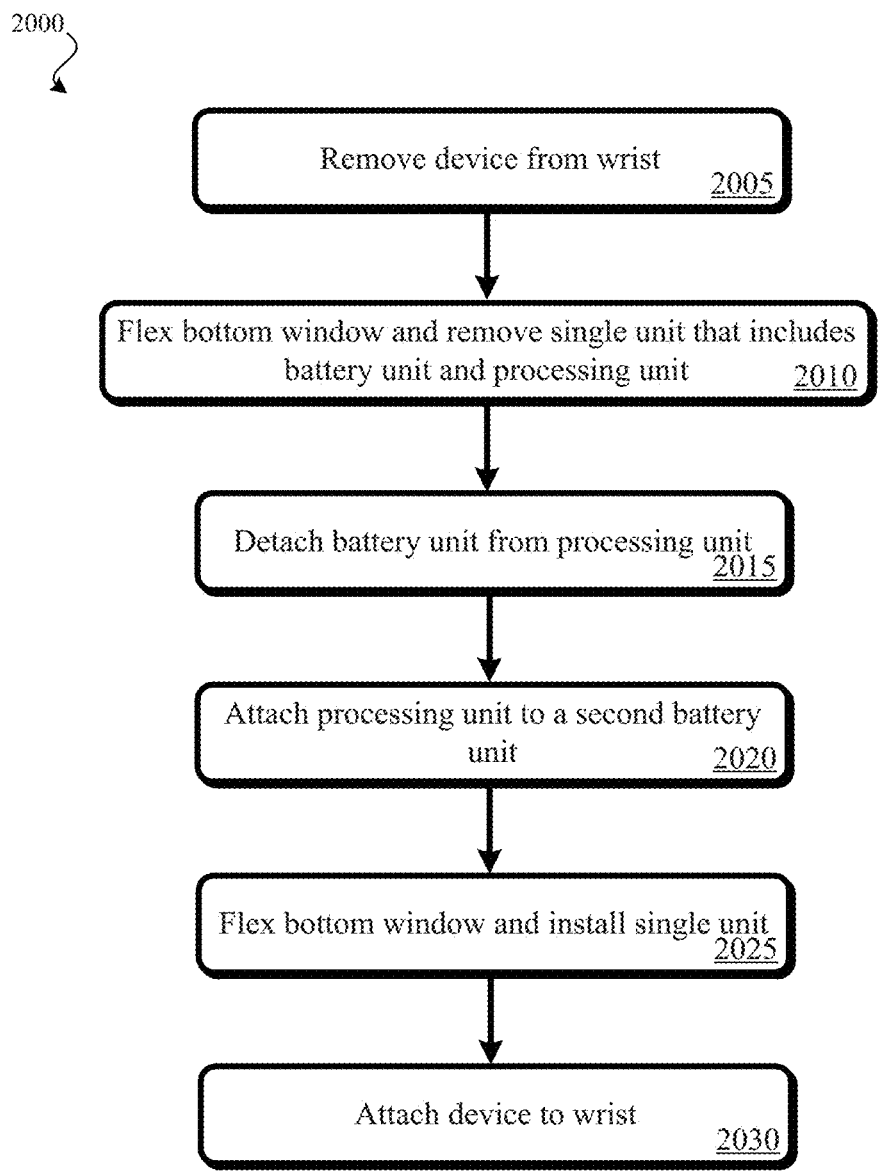
FIG. 20 illustrates an embodiment of a method for swapping power sources for a removable component tracker device.

FIG. 20 illustrates an embodiment of a method for swapping power sources for a removable component tracker device. Method 2000 may be performed using an embodiment of an MMTD from FIGS. 7A-13B or another similar tracker device. At block 2005, if the removable component tracker device is being worn by a user, the user may first remove the removable component tracker device from his wrist in order to swap out the battery (or other form of power source). At block 2010, the bottom window of the component housing may be flexed or otherwise distorted to allow a single unit that includes a battery unit and a processing unit to be removed. Once removed from the component housing, the user may detach the battery unit from the processing unit at block 2015. At block 2020, a more fully charged battery unit may be connected with the processing unit at block 2020. At block 2025, the bottom window of the component housing may be flexed or otherwise distorted to allow the single unit that includes the charged battery unit and the processing unit to be inserted. At block 2030, the user may attach the removable component tracker device to his wrist. At block 2025, alternatively to installing the single unit in the component housing, the user may attach the single unit to another device to be worn by the user, such as pendant 150 of FIG. 1, allowing the single unit of the removable component tracker device to be worn around the user's neck.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A two-way communication device, comprising:
    a processing unit, comprising: a housing, one or more processors; a microphone, a speaker; a plurality of sliders; and a first electrical connector for receiving power, wherein the one or more processors, the microphone, and the speaker are housed by the housing;
    a wristband, comprising:
        a first band section and a second band section, wherein a plurality of slide paths present on the first band section and the second band section permit the processing unit to be removably coupled with the first band section and the second band section by sliding the plurality of sliders into the plurality of slide paths from a wrist side of the first band section and the second band section;
        one or more integrated power sources that are permanently housed within the wristband, the one or more integrated power sources having a second electrical connector to supply power to the processing unit when the processing unit is removably coupled with the wristband; and
    a plurality of magnets to removably couple the processing unit with the first band section and the second band section of the wristband, wherein the plurality of magnets removably coupling the processing unit with the wristband causes the first electrical connector to be electrically connected with the second electrical connector.

2. The two-way communication device of claim 1, wherein the one or more integrated power sources are permanently housed within either the first band section, the second band section, or both the first band section and the second band section.

3. The two-way communication device of claim 2, wherein the first band section comprises a first magnet of the plurality of magnets and the second band section comprises a second magnet of the plurality of magnets, and the processing unit comprises a third magnet and fourth magnet of the plurality of magnets.

4. The two-way communication device of claim 2, wherein the wristband further comprises a fastening system to removably couple the first band section with the second band section.

5. The two-way communication device of claim 1, wherein the second electrical connector is integrated with a magnet of the plurality of magnets.

6. The two-way communication device of claim 1, further comprising a global positioning system (GPS) sensor that receives power from the one or more integrated power sources of the wristband.

7. The two-way communication device of claim 6, wherein the processing unit comprises a wireless transmitter that is configured to periodically transmit an indication of location of the two-way communication device determined using the GPS sensor.

8. The two-way communication device of claim 1, wherein the one or more integrated power sources are configured to be recharged via the second electrical connector while the wristband is detached from the processing unit.

9. A two-way communication apparatus, comprising:
a processing unit, comprising: a housing means, a processing means; an audio input means, an audio output means; a plurality of sliding means; and a first power connection means, wherein the processing means, the audio input means, and the audio output means are housed by the housing means;
a wristband means, comprising:
a first band section and a second band section, wherein a plurality of slide paths present on the first band section and the second band section permit the processing unit to be removably coupled with the first band section and the second band section by sliding the plurality of sliding means into the plurality of slide paths from a wrist side of the first band section and the second band section;
one or more integrated power means that are permanently housed within the wristband means, the one or more integrated power means having a second power connection means to supply power to the processing unit when the processing unit is removably coupled with the wristband means; and
a plurality of magnetic means to removably couple the processing unit with the first band section and the second band section of the wristband means, wherein the plurality of magnetic means removably coupling the processing unit with the wristband means causes the first power connection means to electrically connect with the second power connection means.

10. The two-way communication apparatus of claim 9, wherein the wristband means comprises the one or more integrated power means are permanently housed within either the first band section, the second band section, or both the first band section and the second band section.

11. The two-way communication apparatus of claim 10, wherein the first band section comprises a first magnetic means of the plurality of magnetic means and the second band section comprises a second magnetic means of the plurality of magnetic means, and the processing unit comprises a third magnetic means and fourth magnetic means of the plurality of magnetic means.

12. The two-way communication apparatus of claim 10, wherein the wristband means further comprises a fastening means to removably couple the first band section with the second band section.

13. The two-way communication apparatus of claim 9, wherein the second power connection means is integrated with a magnet of the plurality of magnetic means.

14. The two-way communication apparatus of claim 9, further comprising a global positioning system (GPS) sensor that receives power from the one or more integrated power means of the wristband means.

15. The two-way communication apparatus of claim 9, wherein the processing unit comprises a wireless transmitting means that is configured to packetized data comprising audio received via the audio input means.

16. The two-way communication apparatus of claim 9, wherein the one or more integrated power means are configured to be recharged via the second power connection means while the wristband means is detached from the processing unit.

* * * * *